United States Patent
Narazaki et al.

[11] Patent Number: 6,121,736
[45] Date of Patent: Sep. 19, 2000

[54] CONTROL APPARATUS FOR MOTOR, AND MOTOR UNIT HAVING THE CONTROL APPARATUS

[75] Inventors: Kazushige Narazaki, Katano; Tomokuni Iijima, Osaka; Toru Tazawa, Ibaraki; Yoshiaki Doyama, Hirakata; Yukinori Maruyama, Kadoma, all of Japan

[73] Assignee: Matsushita Electric Industrial Co., Ltd., Osaka-fu, Japan

[21] Appl. No.: 09/344,655

[22] Filed: Jun. 25, 1999

[30] Foreign Application Priority Data

Jul. 10, 1998 [JP] Japan ................................ 10-195396

[51] Int. Cl.⁷ ................................... H02K 23/00
[52] U.S. Cl. .......................... 318/254; 318/138; 318/439; 318/606; 318/608
[58] Field of Search .................... 318/254, 138, 318/439, 606, 608

[56] References Cited

U.S. PATENT DOCUMENTS

| 4,246,075 | 1/1981 | Hilbertz . |
| 5,497,741 | 3/1996 | Tashiro et al. ........................ 318/254 |
| 5,980,211 | 11/1999 | Tojo et al. ............................ 318/254 |

FOREIGN PATENT DOCUMENTS 61-112590  5/1986  Japan .
02032790  2/1990  Japan .

OTHER PUBLICATIONS

Takaharu Takeshita, et al. "Sensorless Brushless DC Motor Drives Using Current Estimation Error" *Japanese Institute of the Electric Engineering T.IEE Japan*, vol. 115–D, No. 4, 1995 pp. 420–427 (Apr. 1995).

Hiroshi Watanabe, et al. "A Sensorless Detecting Strategy of Rotor Position And Speed On Permanent Magnet Synchronous Motor" *Japanese Institute of the Electric Engineering T.IEE Japan*, vol. 110–D, No. 11, 1990 pp. 1193–1200 (Nov. 1990).

*Primary Examiner*—Karen Masih
*Attorney, Agent, or Firm*—Akin, Gump, Strauss, Hauer & Feld, L.L.P.

[57] ABSTRACT

A motor control apparatus and a motor unit having such a motor control apparatus according to the present invention are constructed to detect a terminal voltage for switching elements of the same phase in a dead time period by a voltage output circuit 10, and to detect the instant when the sign of a phase current changes from the detected terminal voltage by a current sign change detection part 11. Based on the phase of a current sign change timing provided from the current sign change detection part 11 and the phase of a phase applied voltage, the first applied voltage control circuit 14 generates a phase applied voltage command to a switching element modulation circuit 9. Such arrangement makes it possible to provide motor continuous energization or motor energization drive near to 180 degrees at high efficiency, without the provision of any current sensors.

23 Claims, 22 Drawing Sheets

F I G. 5
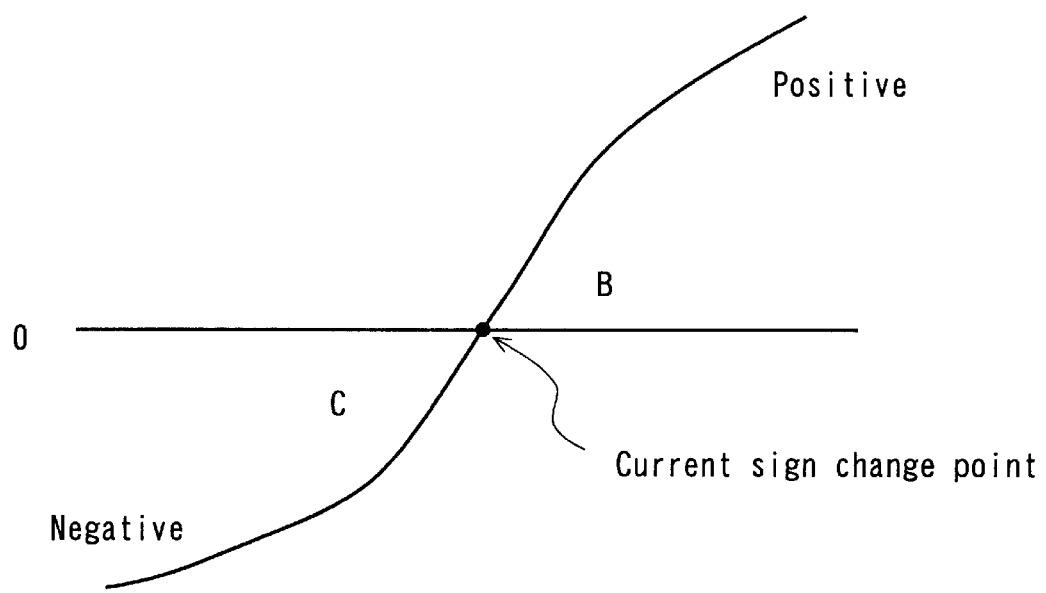

FIG. 6
(a)
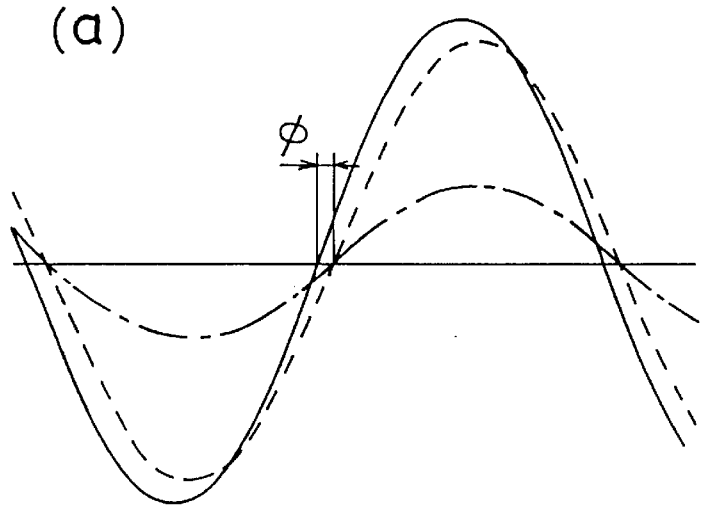
(b)
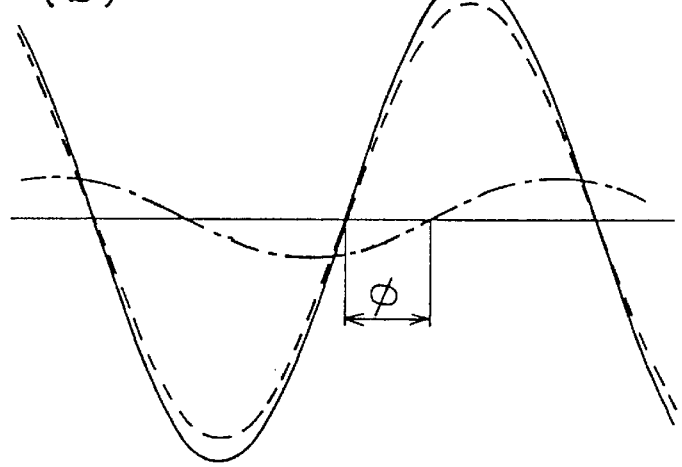
(c)
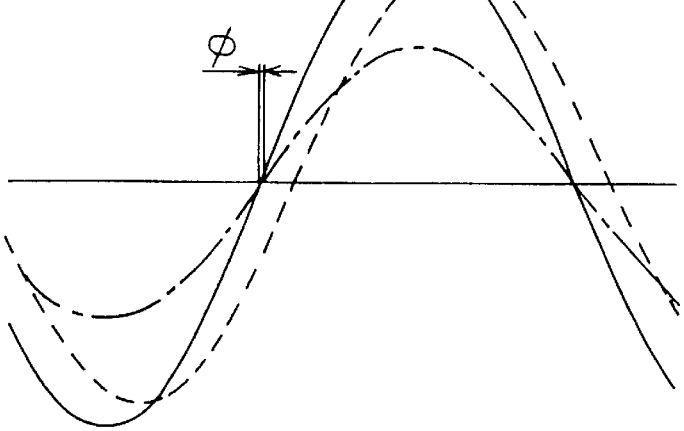

FIG. 8
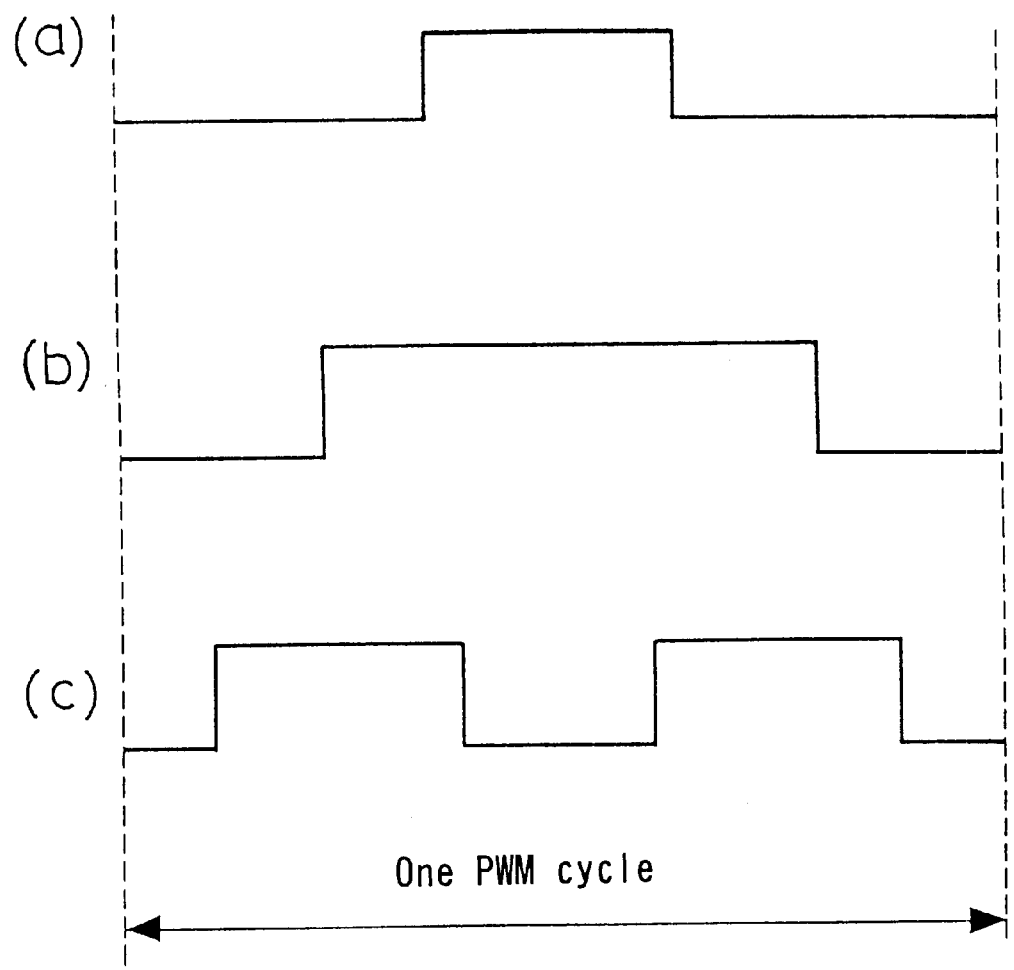
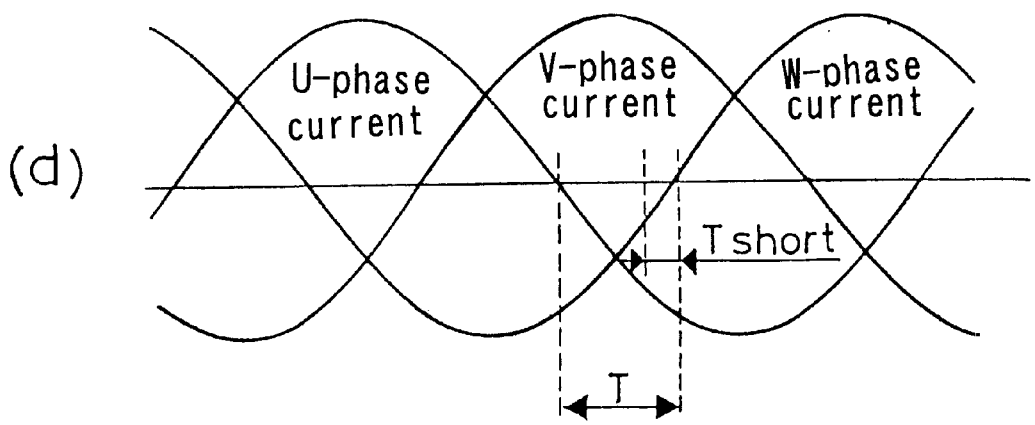

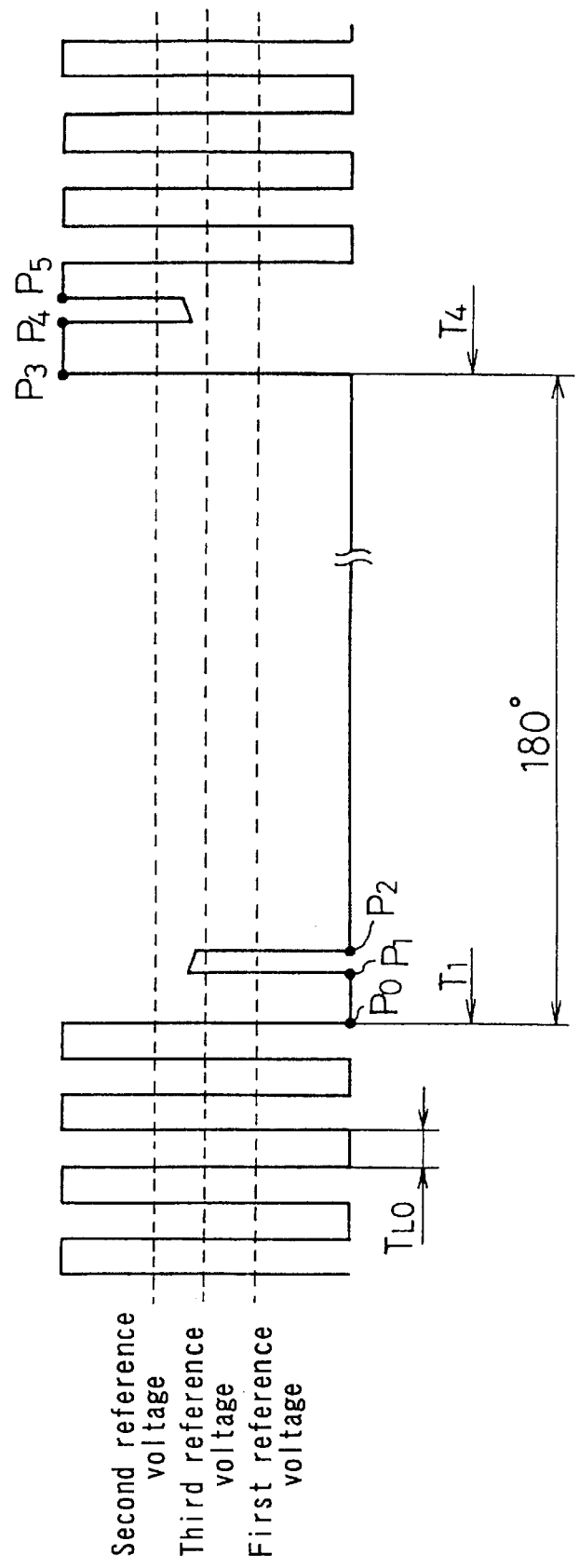
F I G. 15

CONTROL APPARATUS FOR MOTOR, AND MOTOR UNIT HAVING THE CONTROL APPARATUS

BACKGROUND OF THE INVENTION

The present invention relates to a motor control apparatus for controlling of an applied voltage to a motor by sensing phase current state of the motor without using a current sensor, and to a motor unit including such a motor control apparatus.

Conventional motor control apparatus will be described below using two examples.

(1) As a first type of conventional motor control apparatus, there is known a three-phase bridge inverter of a plurality of switching elements and current-circulating diodes connected in parallel with the switching elements, respectively. The motor connected to such an inverter is not provided with a position sensor such as an encoder. In the conventional control apparatus thus constructed, both the upper and lower switching elements are placed in a cut-off state (OFF) to create a non-energization state, and a period of 60 electrical degrees, during which current becomes zero, is provided. By virtue of the provision of such a period in which current becomes zero, a condition is created so that an induced voltage, which is induced by the magnetic poles of a rotor, becomes detectable. The induced voltage thus detected is compared with a specific set value and, based on the compare result, a position of the rotor is detected. According to the rotor position thus detected, this conventional control apparatus carries out to switch the applied voltage of the phases. This prior art is of an energization method that is called the six-step drive or 120 degree conduction, and a current flowing through a stator coil has a current waveform having a rectangular shape. Techniques of the type describe above have been disclosed, for example, in Official Gazette of Japanese Published Unexamined Patent Publication No. Hei 02-32790, Official Gazette of Japanese Published Unexamined Patent Publication No. Sho 61-112590, and Official Gazette of Japanese Allowed Patent Publication No. Sho 59-25038.

(2) As a second prior art for motor control apparatus, techniques have been reported, for example, in reports of the Japanese Institute of the Electric Engineering (T. IEE Japan, Vol. 115-D, No. 4, 1995; pp. 420 (April 1995); and T. IEE Japan, Vol. 110-D, No. 11, 1990; pp. 1193 (November 1990)). In the second prior art, neither an induced voltage is detected with a current zero period created, nor a position sensor is used for direct detection of a rotor position. In the second type conventional technique, however, a current sensor is provided which detects a current flowing in a corresponding coil, and a current value detected by the current sensor and a command voltage value are used to estimate a rotor position θ from a motor theoretical equation as the need arises. The estimated position θ serves to form a 180 degree energization command waveform, and continuous 180 degree (sine wave) energization drive is carried out.

Next, the first prior art described in the foregoing (1) part will be described in detail.

FIG. 20 is a block diagram showing the structure of a commonly used motor control apparatus.

Referring to FIG. 20, the motor 100 has stators (not shown in the figure) and a rotor 200. A coil 300 is wound around each stator through which phase current flows. The stator coil 300 is made up of a u-phase coil 300$u$, a v-phase coil 300$v$, and a w-phase coil 300$w$. Secured on a surface of the rotor 200 is a permanent magnet. Each coil 300 is coupled to an inverter 400 for the controlling of phase voltage application to each coil 300.

As shown in FIG. 20, the inverter 400 has a direct current power source 50, an upper switching element group 60 (61$u$, 61$v$, 61$w$), and a lower switching element group 70 71$u$, 71$v$, 71$w$. The upper and lower switching element groups are respectively groups of upper side and lower side in the figure and are of three-phase-bridge configuration. In addition, the inverter 400 further has diodes 81$u$, 81$v$, 81$w$, 82$u$, 82$v$, and 82$w$ connected in parallel with the switching elements 61$u$, 61$v$, 61$w$, 71$u$, 71$v$, and 71$w$ in the upper switching element group 60 and the lower switching element group 70, respectively. The upper switching element group 60 and the lower switching element group 70 are coupled to a switching element modulation circuit 109, and they are controlled by the switching element modulation circuit 109. Additionally, the conventional control apparatus includes a voltage output circuit 110 formed of resistive elements, an induced voltage detection circuit 113$d$ for the detection of an induced voltage that is induced by the coil 300, a voltage command part 120, a second cut-off period command part 150, and a fourth applied voltage control circuit 152.

The inverter 400, by which the motor 100 is drive-controlled, is provided with the direct current power source 50 whose positive and negative sides are at E[V] and at 0 V, respectively. The upper switching element group 60 forms current paths from the direct current power source 50 to the coil 300 of three phases, namely a u-phase, a v-phase, and w-phase. On the other hand, the lower switching element group 70 forms current return paths from the three-phase coil 300 to the direct current power source 50. The diodes 81$u$, 81$v$, 81$w$, 82$u$, 82$v$, and 82$w$ are connected in reverse parallel with their corresponding switching elements, respectively.

Next, the operation of the conventional control apparatus constructed as described above will be illustrated in detail.

The switching element modulation circuit 109 sends to the upper switching element group 60 as well as to the lower switching element group 70 a conduction (ON) command signal or a cut-off (OFF) command signal for control of the energization voltage to the coil 300 of the coils 300$u$, 300$v$, and 300$w$.

FIG. 21 is a waveform diagram depicting timings of the switching elements and applied voltages in the conventional control apparatus. FIG. 21, comprised of parts (a)–(f), shows conduction (ON) and cut-off (OFF) signals with respect to the upper switching element group 60 (61$u$, 61$v$, 61$w$) and the lower switching element group 70 71$u$, 71$v$, 71$w$. In the parts (a) to (f) of FIG. 21, "HIGH LEVEL" represents the ON state and "LOW LEVEL" represents the OFF state. Accordingly, in a period T1, the upper switching element 61$u$ repeatedly switches on and off by pulse width modulation (PWM), while the lower switching element 71$v$ is placed in the ON state. At this time, the remaining other switching elements 61$v$, 61$w$, 71$u$, 71$w$ are all placed in the OFF state. As a result, the upper switching element 61$u$ of the u-phase and the lower switching element 71$v$ of the v-phase conduct, thereby causing a current to flow from the stator coil 300$u$ of the u-phase to the stator coil 300$v$ of the v-phase.

Likewise, in a period T2, the upper switching element 61$u$ repeatedly switches on and off by PWM, while the lower switching element 71$w$ is placed in the ON state. At this time, the remaining other switching elements 61$v$, 61$w$, 71$u$, and 71$v$ are all placed in the OFF state. As a result, there is a current flow from the u-phase coil 300$u$ to the w-phase coil 300$w$.

Likewise, in a period T3, there is a current flow from the coil 300v to the coil 300w. In a period T4, there is a current flow from the coil 300v to the coil 300u. In a period T5, there is a current flow from the coil 300w to the coil 300u. In a period T6, there is a current flow from the coil 300w to the coil 300v.

As described above, the timing of the conduction (ON) and cut-off (OFF) in the periods T1–6 is repeated to control phases that are electrically energized for every 60 electrical degrees, causing the rotor 200 to rotate. In this case, currents, which flow through the coils 300u, 300v, and 300w, have individual waveforms that differ in phase from one another by 120 electrical degrees. FIG. 22 is a waveform diagram depicting a phase induced voltage induced in a phase at that time and a waveform of a phase current flowing in the phase.

The period from the start of the period T1 up to the end of the period T3 represents a 180 electrical degree period. The control apparatus, shown in FIG. 20, is fed a command so that, in each of the phases, voltage is applied in a period of 120 degrees of the 180 electrical degree period. Accordingly, this control apparatus is called the 120 degree energization. Alternatively, the control apparatus is called the six-step drive because phases which are electrically energized are switched for every 60 degrees of the 360 electrical degrees.

These conduction and cut-off control periods have been given beforehand by the second cut-off period command part 150 (FIG. 20).

Next, a way of obtaining a timing signal for the switching between the periods T1–6 in the conventional control apparatus will be described.

In the first place, the voltage output circuit 110 detects voltages (Vu, Vv, Vw) applied to input/output terminals of currents to the coil 300 located between the upper and the lower switching elements 61u, 61v, and 61w and 71u, 71v, and 71w of the respective phases.

Parts (g)–(i) of FIG. 21 are waveform diagrams showing the terminal voltages Vu, Vv , and Vw of the respective phases of the coil 300.

Each of the terminal voltages in the period T1 will be discussed. The u-phase terminal voltage Vu is almost the voltage E[V] of the direct current power source 5 when the upper switching element 61u turns on. On the other hand, when the upper switching element 61u turns off, the terminal voltage Vu is 0 V because a current flows through the diode 82u. In the period T1, the v-phase terminal voltage Vv is almost 0 V because the lower switching element 71v is in the ON state.

At the beginning of the period T1, a current flows in the coil 300w through the diode 82w. During this period, the w-phase terminal voltage Vw is 0 V. Then, after the current becomes zero, an induced voltage appears in the w-phase when the upper switching element 61u is in the ON state. At this instant, there is created a state capable of detecting induced voltages. It is to be noted that, when the upper switching element 61u is in the OFF state, it is impossible to detect an induced voltage. Accordingly, by providing a cut-off control period of 60 electrical degrees for cutting off energization and causing the current to become zero, it becomes possible to detect an induced voltage resulting from the rotation of the rotor 200. The terminal voltage Vw when the upper switching element 61u is in the ON state will vary with the rotation of the rotor 200. In other words, terminal voltage detection makes it possible to detect a rotation position of the rotor 200. It is to be noted that, when the w-phase induced voltage in the T1 interval is ew, a voltage, expressed by 3ew/2+E/2, is output as a terminal voltage. A relationship between the induced voltage and the rotation position of the rotor 200 is stated in detail in the previously-mentioned Official Gazette of Japanese Published Unexamined Patent Publication No. Hei 02-32790.

Based on the induced voltage thus detected, the timing of energization for each coil 300 is controlled as follows.

A digital method of instantly detecting an induced voltage will be described concretely.

In the period T1, there is made a comparison between an output induced voltage of the w-phase (ew) and a preset reference voltage (E/2). When the induced voltage (ew) crosses the reference voltage (E/2), this causes the induced voltage detection circuit 113d to provide a zero cross signal. When a voltage lead angle α from the output timing of a zero cross signal is 0 degree, a timing, which is advanced in electrical angle by 30 degrees with respect to the zero cross signal output timing, is made to serve as a subsequent commutation timing and is determined to be the start point of the period T2.

Actually, the terminal voltages in each coil 300 are voltage-divided by resistive elements. A voltage-divided induced voltage is compared with a reference voltage corresponding to that voltage-divided induced voltage. An output zero cross signal as a result of comparison with the induced voltage is fed into a computer and is processed. It is to be noted that a timing which is advanced 30 degrees in electrical angle can be calculated easily using a timer within a computer.

As described above, by comparing an induced voltage with the reference voltage, a zero cross signal will be output at an early stage when the rotation speed of the rotor 200 becomes fast. As a result, a change in the phase to be electrically energized is made early according to the output zero cross signal. By detecting an induced voltage in the way described above, application of a voltage is carried out at a timing according to the rotor position of the motor 100.

The above-described technique may be defined as follows. When the fourth applied voltage control circuit 152 provides a cut-off control signal for w-phase switching elements, the induced voltage detection circuit 113d detects the terminal voltage Vw of the w-phase provided from the voltage output circuit 110 in a link operation with a switching signal of a different phase provided from the switching element modulation circuit 109. The induced voltage detection circuit 113d outputs a zero cross signal in the event that the detected induced voltage intersects the reference voltage.

Next, according to the zero cross signal from the induced voltage detection circuit 113d and a cut-off command period of 60 degrees from the second cut-off period command part 150, the fourth applied voltage control circuit 152 provides, to the switching element modulation circuit 109, a conduction/cut-off control signal so that the switching enabling and disabling of given switching elements is controlled. For example, when the voltage lead angle α is 0 degree, the fourth applied voltage control circuit 152 provides a switching cut-off control signal of the lower switching element 71v and a switching conduction control signal of the lower switching element 71w at a timing which is advanced 30 degrees in electrical angle to the switching element modulation circuit 109.

As described above, the fourth applied voltage control circuit 152 sequentially produces commutation timings for the periods T1–6 while the motor 100 is rotating. Also in the periods from T2 to T6, phases to be electrically energized change as in the above; however, it is possible to detect the timing of commutation by the same control method as the foregoing control method.

The fourth applied voltage control circuit 152 provides to the switching element modulation circuit 109 a conduction/cut-off control signal at the individual timings T1–6 to each phase. Then, the switching element modulation circuit 109 provides a conduction/cut-off signal in a PWM cycle only when a conduction control signal is input, and performs actual conduction/cut-off operations on switching elements. Because of this, the fourth applied voltage control circuit 152 exerts switching element control at a higher level in comparison with the switching element modulation circuit 109.

In other words, the fourth applied voltage control circuit 152 continuously provides a conduction control signal in the periods T1 and T2 of the part (a) of FIG. 21, which however does not mean that the fourth applied voltage control circuit 152 places the switching element 61u in the conducting state all the time. In the following description, the fourth applied voltage control circuit 152 sends a conduction/cut-off control signal to the switching element modulation circuit 109 and the switching element modulation circuit 109 sends a conduction/cut-off control signal to each of the switching elements of the inverter 400 in a PWM cycle.

Further, from the interval between zero cross signals sequentially provided from the induced voltage detection circuit 113d, a rotation speed of the rotor is detected. The voltage command part 120 produces a phase voltage command Vh by proportional-plus-integral operation of the difference between the detected rotation speed and a target speed and provides it (not shown in the figure). Further, the voltage command part 120 provides, based on the detected speed, the voltage lead angle α.

Subsequently, the phase voltage command Vh and the voltage lead angle α both provided from the voltage command part 120 are fed to the fourth applied voltage control circuit 152. The fourth applied voltage control circuit 152 provides, to the switching element modulation circuit 109, a conduction/cut-off control signal of each of the switching elements for every 60 electrical degrees, a conduction/cut-off change timing control signal for every 60 electrical degrees, and a phase voltage command Vsou when performing PWM switching operations in a 60 electrical degree period. Then, the switching element modulation circuit 109 actually performs a pulse width modulation operation according to the phase voltage command Vsou and a conduction/cut-off operation on each of the switching elements for every 60 electrical degrees, for the application of voltage to each coil 300 of the motor 100.

Here, when the phase voltage command Vsou is great in the switching element modulation circuit 109, the width of an on-duty Ton of the switching element 6u in the period T1 shown in the part (a) of FIG. 21 will increase resulting in application of a high voltage thereto.

As described above, the preparation of phases into which no current flows causes an induced voltage corresponding to the rotation position of the rotor 200 to appear in a terminal voltage of the motor 100. Then, the zero cross position of the induced voltage and the reference voltage is detected to perform a phase commutation, whereby it becomes possible to control the rotation of the motor in synchronization with the rotation position of the rotor 200. Such a period of 60 degrees is required to bring the current back to zero and to detect an induced voltage zero cross position even when the rotor 200 greatly varies in position.

In accordance with the above-described conventional structure, however, the detecting of an induced voltage at each coil 300 requires forced formation of a 60 degree cut-off period such as the periods T3 and T6 (during which the switching elements 61u and 71u are not electrically energized) in the u-phase, the periods T2 and T5 in the v-phase which are non-energization periods, and the periods T1 and T4 in the w-phase which are non-energization periods, as shown in FIG. 21. Consequently, in the conventional control apparatus, 120 degree energization is inevitable, as a result of which neither 180 degree continuous energization nor wide-angle (in excess of 120 degrees) energization becomes impossible to carry out.

FIG. 22 is a waveform diagram depicting a phase induced voltage and a phase current in 120 degree energization in a conventional control apparatus. In conventional control apparatus, a phase current exhibits a waveform as shown in FIG. 22, therefore resulting in an increased torque ripple. This produces the problem that the degree of vibration of the motor 100 increases, and efficiency drops.

As a system intended to provide a solution to the above-described problem, there has been proposed the foregoing conventional technique described in the column (2) of the prior art description part. In accordance with this prior art, current sensors are separately provided which directly detect currents flowing in respective coils, and by making use of a current value detected by such a current sensor and a command voltage value, the rotor position θ is estimated from a motor theoretical equation as the need arises. This prior art control apparatus is a method of producing a series of current commands from an estimated rotor position θ to perform 180 degree (sine wave) energization drive. This method employs no non-energization periods, thereby solving the foregoing problem, but it requires the provision of current sensors, therefore resulting in producing another problem that the costs will increase.

Accordingly, in the conventional control apparatus, it is impossible to carry out continuous energization or an energization angle near to 180 degrees at high efficiency without the provision of any current sensors.

BRIEF SUMMARY OF THE INVENTION

Accordingly, an object of the present invention is to provide a motor control apparatus and a motor unit having such a motor control apparatus capable of (i) providing solutions to the above-described problems with the prior art techniques, (ii) performing continuous energization or an energization angle near to 180 degrees at high efficiency without the provision of any current sensors, and, thereby (iii) reducing the degree of vibration in rotation.

In order to achieve the object stated above, the present invention discloses a motor control apparatus, said motor control apparatus comprising:

an upper switching element group having a plurality of switching elements which form current paths to coils of respective phases of said motor;

a lower switching element group having a plurality of switching elements which form current paths from said coils of said respective phases of said motor;

a plurality of diodes, each said diode being connected in reverse parallel with a corresponding one of said switching elements of said upper and lower switching element groups;

switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;

voltage output means for detecting terminal voltage values of said coils of said respective phases connected between said switching elements of respective phases in said upper and lower switching element groups, and for providing said detected terminal voltage values;

at least one current sign change detection means for detecting, from said conduction/cut-off signal of said switching element modulation means and said terminal voltage values detected by said voltage output means, a timing of the sign change of a phase current, and for providing a current sign change timing signal; and first applied voltage control means for issuing, based on said current sign change timing signal and applied voltage values of said coils of said respective phases, a phase applied voltage command to said switching element modulation means.

The motor control apparatus constructed as described above is able to perform continuous energization at high efficiency without the provision of any current sensors.

A motor control apparatus of the present invention in another aspect comprises:

an upper switching element group having a plurality of switching elements which form current paths to coils of respective phases of said motor;

a lower switching element group having a plurality of switching elements which form current paths from said coils of said respective phases of said motor;

a plurality of diodes, each said diode being connected in reverse parallel with a corresponding one of said switching elements of said upper and lower switching element groups;

switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;

voltage output means for detecting terminal voltage values of said coils of said respective phases connected between said switching elements of respective phases in said upper and lower switching element groups, and for providing said detected terminal voltage values;

at least one current sign change detection means for detecting, from said conduction/cut-off signal of said switching element modulation means and said terminal voltage values detected by said voltage output means, a timing of the sign change of a phase current, and for providing a current sign change timing signal;

first cut-off period command means for setting a cut-off control period so that, when said current sign change detection means detects a change in the sign of a phase current, switching elements of a corresponding phase are cut off for a given period of time and for providing said set cut-off control period;

induced voltage detection means for detecting, based on an output voltage from said voltage output means, induced voltage information, when a cut-off control signal of said cut-off control period is provided; and second applied voltage control means for providing, based on said induced voltage information and said cut-off control period provided from said first cut-off period command means, a conduction/cut-off control signal and a phase applied voltage command to said switching element modulation means.

The motor control apparatus constructed as described above is able to perform an energization angle near to 180 degrees at high efficiency without the provision of any current sensors.

A motor control apparatus of the present invention in still another aspect comprises:

an upper switching element group having a plurality of switching elements which form current paths to coils of respective phases of said motor;

a lower switching element group having a plurality of switching elements which form current paths from said coils of said respective phases of said motor;

a plurality of diodes, each said diode being connected in reverse parallel with a corresponding one of said switching elements of said upper and lower switching element groups;

switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;

voltage output means for detecting terminal voltage values of said coils of said respective phases connected between said switching elements of respective phases in said upper and lower switching element groups, and for providing said detected terminal voltage values;

current zero decision means for providing, based on said terminal voltage values provided from said voltage output means after said switching elements of the same phase are cut off according to a cut-off control signal, a current zero signal indicative of a state in which a phase current becomes zero so that an induced voltage becomes detectable;

induced voltage detection means for detecting, based on said terminal voltage values provided from said voltage output means on the basis of switching states of said remaining switching elements other than said switching elements of the same phase, induced voltage information upon receipt of said current zero signal from said current zero decision means and for providing said detected induced voltage information; and third applied voltage control means for providing to said switching element modulation means a conduction control signal so that phases that have been cut off are made to conduct immediately after said induced voltage information is provided from said induced voltage detection means, thereby to cause all the phases to switch, and for providing, based on said induced voltage information, a conduction/cut-off control signal and a phase applied voltage command to said switching element modulation means.

The motor control apparatus constructed as described above is able to perform an energization angle near to 180 degrees at high efficiency without the provision of any current sensors.

A motor control apparatus of the present invention in a further aspect comprises:

an upper switching element group having a plurality of switching elements which form current paths to coils of respective phases of said motor;

a lower switching element group having a plurality of switching elements which form current paths from said coils of said respective phases of said motor;

a plurality of diodes, each said diode being connected in reverse parallel with a corresponding one of said switching elements of said upper and lower switching element groups;

switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;

voltage output means for detecting terminal voltage values of said coils of said respective phases connected between said switching elements of respective phases in said upper and lower switching element groups, and for providing said detected terminal voltage values;

at least one current sign change detection means for detecting, from said conduction/cut-off signal of said switching element modulation means and said terminal voltage values detected by said voltage output means, a timing of the sign change of a phase current, and for providing a current sign change timing signal; and first applied voltage control means for issuing, based on said current sign change timing signal and applied voltage values of said coils of said respective phases, a phase applied voltage command to said switching element modulation means;

second cut-off period command means for setting a cut-off control period so that said switching elements of the same phase are cut off continuously regardless of phase current values and for providing said set cut-off control period;

induced voltage detection means for detecting, based on an output voltage from said voltage output means, induced voltage information in a period during which a cut-off control signal of said cut-off control period is provided and for providing said detected induced voltage information; and fourth applied voltage control means for binarizing an induced voltage of said induced voltage information provided from said induced voltage detection means to form an induced voltage timing signal and for providing, based on said induced voltage timing signal and said cut-off control period from said second cut-off period command means, a conduction/cut-off control signal and a phase applied voltage command to said switching element modulation means;

whereby, when the speed of said motor is high or when the variation in speed of said motor is great, said switching element modulation means will be controlled by said fourth applied voltage control means; and whereby, when the speed of said motor is low or when the variation in speed of said motor is small, said switching element modulation means will be controlled by said first applied voltage control means.

The motor control apparatus constructed as described above is able to perform continuous energization at high efficiency with good stability without the provision of any current sensors, and to hold the degree of vibration low.

A motor control apparatus of the present invention in a still further aspect comprises:

an upper switching element group having a plurality of switching elements which form current paths to coils of respective phases of said motor;

a lower switching element group having a plurality of switching elements which form current paths from said coils of said respective phases of said motor;

a plurality of diodes, each said diode being connected in reverse parallel with a corresponding one of said switching elements of said upper and lower switching element groups;

switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;

voltage output means for detecting terminal voltage values of said coils of said respective phases connected between said switching elements of respective phases in said upper and lower switching element groups, and for providing said detected terminal voltage values;

at least one current sign change detection means for detecting, from said conduction/cut-off signal of said switching element modulation means and said terminal voltage values detected by said voltage output means, a timing of the sign change of a phase current, and for providing a current sign change timing signal;

first cut-off period command means for setting a cut-off control period so that, when said current sign change detection means detects a change in the sign of a current, switching elements of a corresponding phase are cut off for a given period of time and for providing said set cut-off control period;

induced voltage detection means for detecting, based on an output voltage from said voltage output means, induced voltage information;

second applied voltage control means for providing, based on said induced voltage information and said cut-off control period provided from said first cut-off period command means, a conduction/cut-off control signal and a phase applied voltage command to said switching element modulation means;

second cut-off period command means for setting a cut-off control period so that said switching elements of the same phase continue to be cut off regardless of phase current and for providing said set cut-off control period; and fourth applied voltage control means for providing, based on an induced voltage timing signal as a result of binarization of an induced voltage of said induced voltage information provided from said induced voltage detection means, a conduction/cut-off control signal and a phased applied voltage command to said switching element modulation means;

whereby, when the speed of said motor is high or when the variation in speed of said motor is great, said switching element modulation means will be controlled by said fourth applied voltage control means; and whereby, when the speed of said motor is low or when the variation in speed of said motor is small, said switching element modulation means will be controlled by said second applied voltage control means.

The motor control apparatus constructed as described above is able to perform an energization angle near to 180 degrees at high efficiency with good stability without the provision of any current sensors, and to hold the degree of vibration low.

The present invention provides a motor unit comprising:

a rotor having a permanent magnet;

a stator having coils of plural phases;

an upper switching element group having a plurality of switching elements which form current paths to coils of respective phases;

a lower switching element group having a plurality of switching elements which form current paths from said coils of said respective phases;

a plurality of diodes, each said diode being connected in reverse parallel with a corresponding one of said switching elements of said upper and lower switching element groups;

switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases;

voltage output means for detecting terminal voltage values of said coils of said respective phases connected between said switching elements of respective phases in said upper and lower switching element groups, and for providing said detected terminal voltage values;

at least one current sign change detection means for detecting, from said conduction/cut-off signal of said switching element modulation means and said terminal voltage values detected by said voltage output means, a timing of the sign change of a phase current, and for providing a current sign change timing signal; and first applied voltage control means for issuing, based on said current sign change timing signal and applied voltage values of said coils of said respective phases, a phase applied voltage command to said switching element modulation means.

The motor unit constructed as described above is able to perform continuous energization at high efficiency without the provision of any current sensors, and to hold the degree of vibration low.

While the novel features of the invention are set forth particularly in the appended claims, the invention, both as to organization and content, will be better understand and appreciated, along with other objects and features thereof, from the following detailed description taken in conjuction with the drawings.

BRIEF DESCRIPTION OF THE SEVERAL VIEWS OF THE DRAWING

FIG. 5 is a waveform diagram showing variation in the u-phase current with respect to the terminal voltage Vu shown in the part (e) of FIG. 3 in the first embodiment;

FIG. 6 is a waveform diagram illustrative of waveforms of a phase applied voltage, a phase induced voltage, and a phase current in the first embodiment and shows differences in phase between the phase applied voltage and the phase current;

FIG. 8 is comprised of waveform diagrams including conduction/cut-off period timings of switching elements in the first embodiment. A part (a) of FIG. 8 is a waveform diagram showing a conduction/cut-off timing of the u-phase switching element 6u in the first embodiment, a part (b) of FIG. 8 is a waveform diagram showing a conduction/cut-off timing of a switching element 6v of the v-phase in the first embodiment, a part (c) of FIG. 8 is a waveform diagram showing a conduction/cut-off timing of a switching element 6w of the w-phase in the first embodiment, and a part (d) of FIG. 8 is a diagram illustrative of a u-phase, a v-phase, and a w-phase current waveform;

FIG. 15 shows terminal and reference voltages in the third embodiment and serves as a diagram descriptive of the timing of detecting an induced voltage;

It will be recognized that some or all of the Figures are schematic representations for purposes of illustration and do not necessarily depict the actual relative sizes or locations of the elements shown.

DETAILED DESCRIPTION OF THE INVENTION

Preferred embodiments of a motor control apparatus and a motor unit including the motor control apparatus in accordance with the present invention will be described below by reference to the attached drawings.
First Embodiment FIG. 1 is a block diagram showing the structure of a motor unit having therein a motor and a motor control apparatus in accordance with the first embodiment of the present invention.

Figure 1:
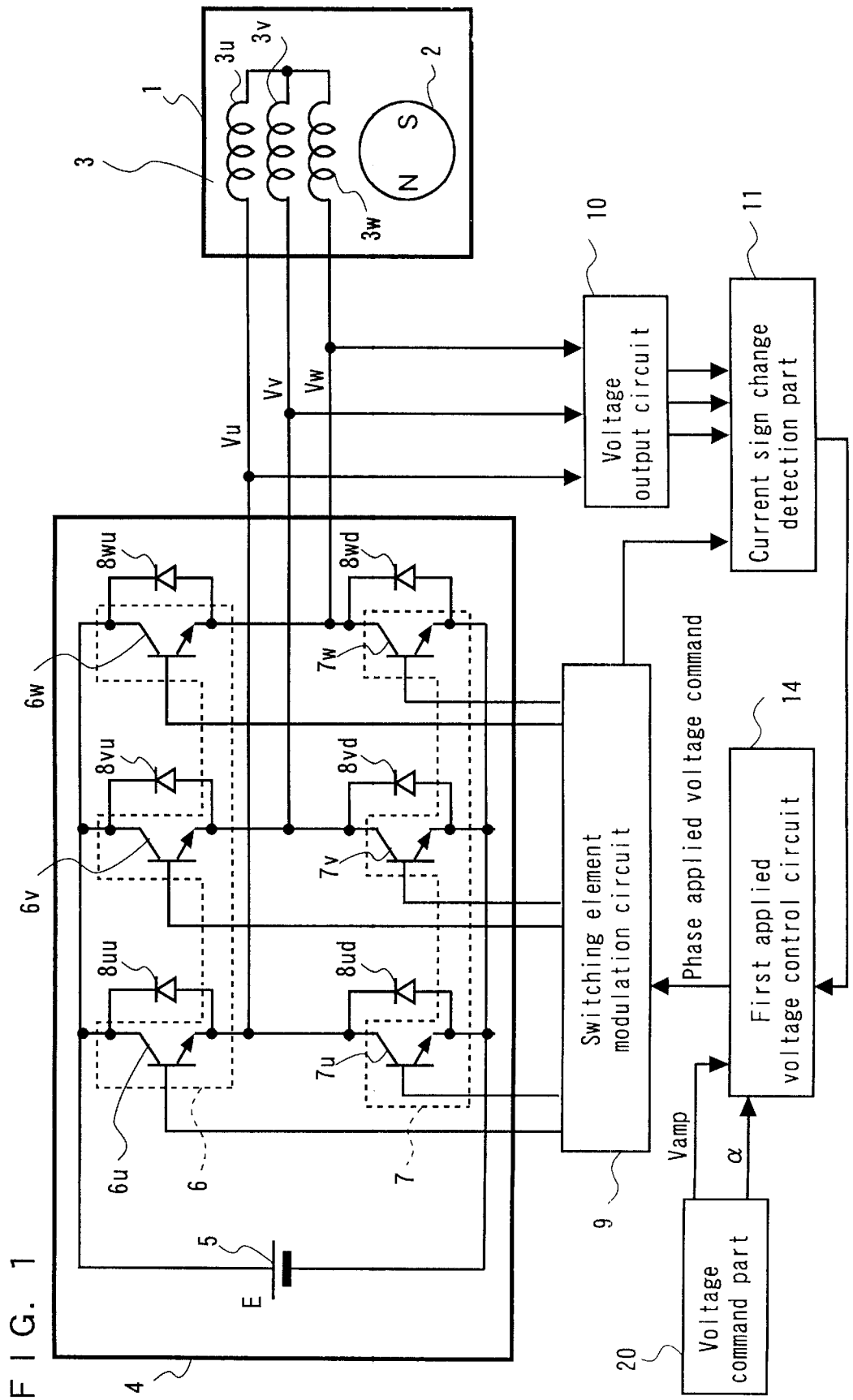
FIG. 1 is a block diagram showing the structure of a motor unit in a first embodiment in accordance with the present invention.

Referring to FIG. 1, a motor 1 includes stators (not shown in the figure) and a rotor 2. A coil 3, through which phase current flows, is wound around each of the stators. The stator coil 3 is made up of a u-phase coil 3u, a v-phase coil 3v, and a w-phase coil 3w. Disposed on a surface of the rotor 2 is a permanent magnet. Each coil 3 is coupled to an inverter 4, wherein the inverter 4 controls a voltage that is applied to each coil 3.

As shown in FIG. 1, the inverter 4 includes a direct current power source 5, an upper switching element group 6 (6u, 6v, 6w), and a lower switching element group 7 7u, 7v, 7w wherein the lower and upper switching element groups 6, 7 are configured in three-phase bridge. The upper switching element group 6 and the lower switching element group 7 are switching element groups, respectively drawn in the upper part and lower part of the circuit diagram, respectively. Therefore, they may be called "a first switching element group" and "a second switching element", respectively. Additionally, the inverter 4 is provided with diodes 8uu, 8vu, 8wu, 8ud, 8vd, and 8wd which are connected in reverse parallel with the switching elements 6u, 6v, 6w, 7u, 7v, 7w, of the upper and lower switching element groups 6 and 7, respectively. Both the upper switching element group 6 and the lower switching element group 7 are connected to a switching element modulation circuit 9 as a switching element modulation means, and are controlled by the switching element modulation circuit 9.

In addition, the motor control apparatus according to the first embodiment is provided with a voltage output circuit 10 as a voltage output means operable to perform voltage division by resistive elements to provide a voltage signal proportional to the voltage of each phase. The voltage output circuit 10 detects actual voltages (Vu, Vv, Vw) applied at current input/output terminals to the coil 3 between the upper switching elements 6u, 6v, and 6w of the respective phases and the lower switching elements 7u, 7v, 7w, of the respective phases.

Further, the motor control apparatus according to the first embodiment is provided with a current sign change detection part 11 as a current sign change detection means which is fed voltage signals of the respective phases, a voltage command part 20 as a voltage command means, and a first applied voltage control circuit 14 as a first applied voltage control means.

The direct current power source 5 of the inverter 4 which drive controls the motor 1 has a positive side of E[V] and a negative side of 0 V. The upper switching element group 6 form current paths from the direct current power source 5 to the coil 3 of three phases (i.e., a u-phase, a v-phase, and a w-phase). On the other hand, the lower switching element group 7 forms current return paths from the three-phase coil 3 to the direct current power source 5. The diodes 8uu, 8vu, 8wu, 8ud, 8vd, and 8wd, disposed in the inverter 4, are connected in reverse parallel with the switching elements 6u, 6v, 6w, 7u, 7v, and 7w, respectively.

Next, switching operations in the motor control apparatus according to the first embodiment constructed as described above will be described in detail.

Figure 2:
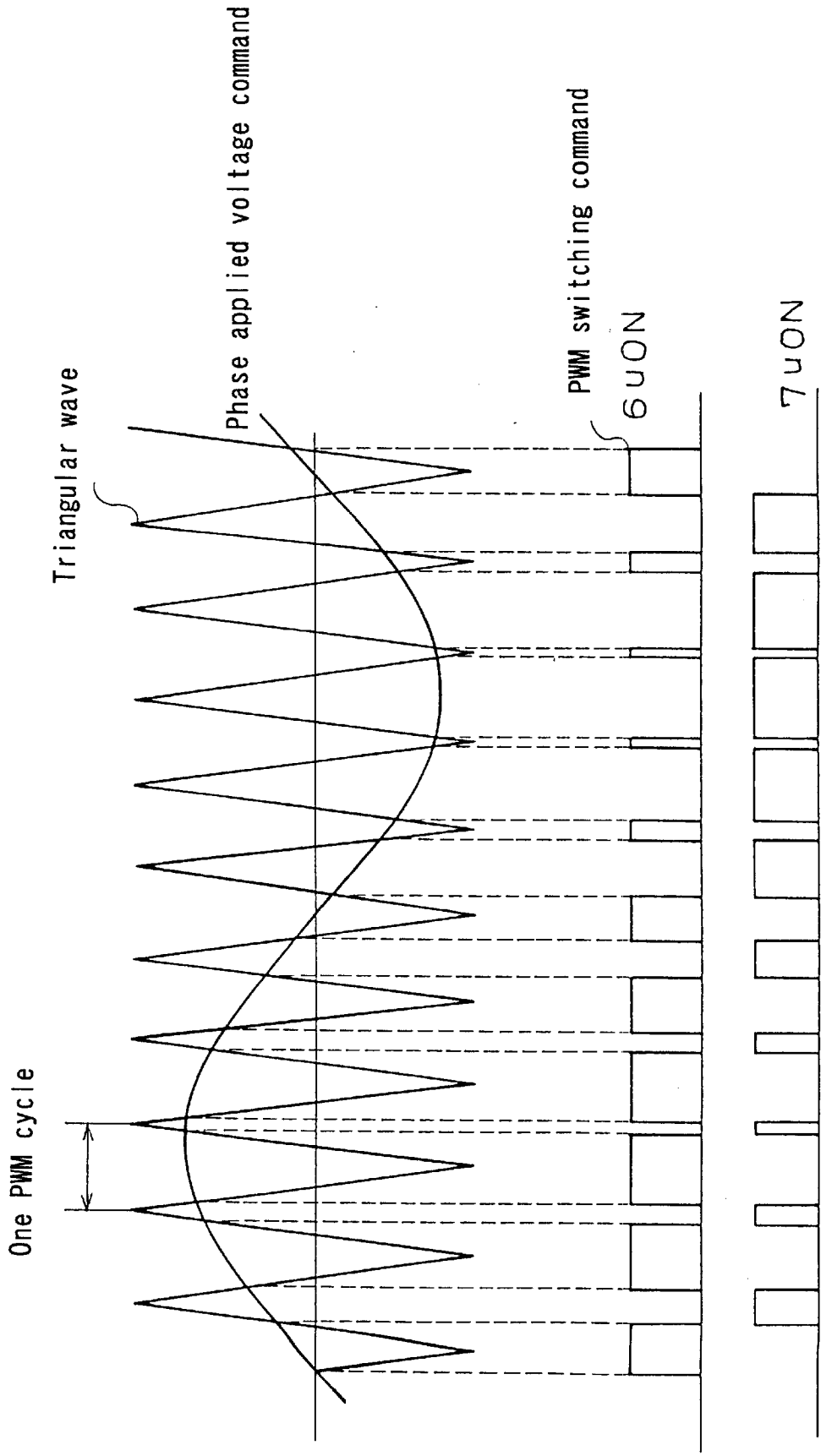
FIG. 2 is a waveform diagram showing a phase applied voltage command and a PWM switching command in the first embodiment.

FIG. 2 is a waveform diagram illustrating a triangular wave for use in a PWM (Pulse Width Modulation) operation, a phase applied voltage command, and a PWM switching command that is issued to the switching elements 6u and 7u of the u-phase.

As shown in FIG. 2, for the reduction of switching element loss, a phase applied voltage command issued from the first applied voltage control circuit 14 is compared with a triangular wave in the switching element modulation circuit 9. In the case that the comparison result shows that the voltage of the phase applied voltage command is higher than that of the triangular wave, the upper switching element group 6 is then placed in the conducting (ON) state. On the other hand, when the voltage of the phase applied voltage command is lower than that of the triangular wave, the lower switching element group 7 is then placed in the conducting (ON) state. As shown in FIG. 2, an ON or OFF PWM switching command is given to the switching element groups 6 and 7 in one PWM cycle (one cycle of the triangular wave). The voltage that is applied to each phase is controlled according to the length of an ON period in a PWM switching command.

The above-described control method, which has been well known in the field of the controlling of the switching elements of the motor 1, is called the triangular wave compare PWM method. Such a triangular wave compare PWM method employs PWM cycles ranging from about 300 μsec to about 50 μsec.

Figure 3:
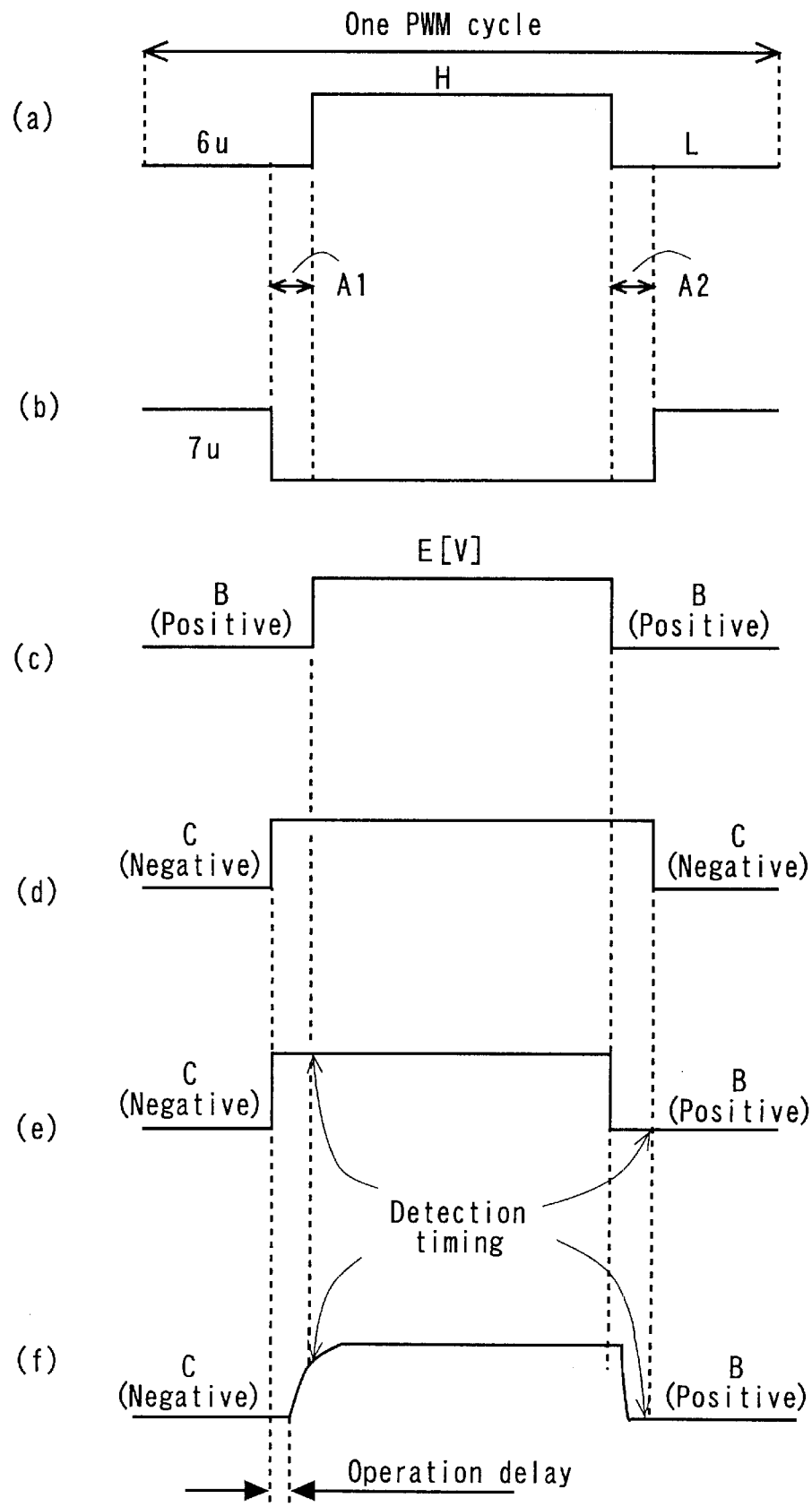
FIG. 3 is comprised of (i) waveform diagrams depicting switching elements conduction/cut-off timings and (ii) waveform diagrams of coil terminal voltages in the first embodiment, wherein a part (a) of FIG. 3 is a waveform diagram showing the timing of the conduction/cut-off of a switching element 6u in the first embodiment, a part (b) of FIG. 3 is a waveform diagram showing the timing of the conduction/cut-off of a switching element 7u in the first embodiment, a part (c) of FIG. 3 is a waveform diagram showing a terminal voltage Vu when current flows in a positive direction in the first embodiment, a part (d) of FIG. 3 is a waveform diagram showing the terminal voltage Vu when current flows in a negative direction in the first embodiment, a part (e) of FIG. 3 is a waveform diagram showing the terminal voltage Vu when current flow changes from a negative direction to a positive direction in the first embodiment, and a part (f) of FIG. 3 is a waveform diagram showing an actual terminal voltage Vu when taking into account operation delays and terminal voltage rising and falling slopes with respect to the waveform shown in the part (e) of FIG. 3 in the first embodiment.
Figure 4:
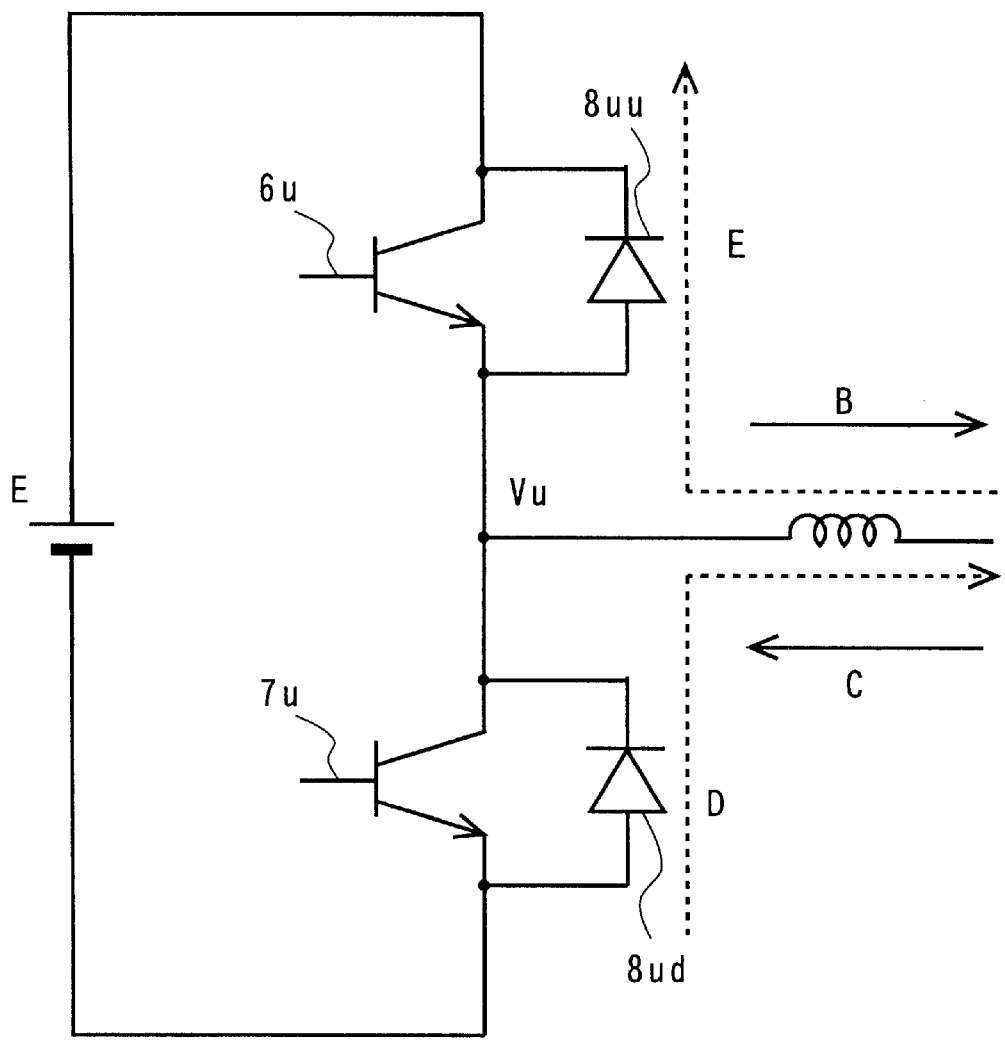
FIG. 4 is a diagram for the description of a current path for the u-phase current in the first embodiment.

Next, referring now to FIGS. 3 and 4, further detailed operations when the upper and lower switching elements 6u and 7u of the u-phase conduct and are cut off in a single PWM cycle, and variations in the terminal voltage Vu will be described. FIG. 3 is a detailed waveform diagram showing a PWM switching command and a terminal voltage in one PWM cycle. FIG. 4 is a circuit diagram illustrative of current paths along which current flows in the upper and lower switching elements 6u and 7u and the diodes 8uu and 8ud of the u-phase.

In the case that, in the switching element groups 6 and 7, upper and lower switching elements of a specific phase (for example, the upper switching element 6u and the lower switching element 7u) are simultaneously placed in the conducting state, this produces the problem that a short-circuit state is created, therefore to cause a large current to flow in the circuit, resulting in destruction of the switching elements. In order to prevent the occurrence of such a large current flow, a simultaneous cut-off period is provided at the instant when upper and lower switching elements of the same phase are switched, whereby the switching elements can be cut off at the same time.

Part (a) of FIG. 3 is a waveform diagram showing a timing of the conduction/cut-off of the upper switching element 6u of the u-phase in one PWM cycle. Part (b) of FIG. 3 is a waveform diagram showing a timing of the conduction/cut-off of the lower switching element 7u of the u-phase in one PWM cycle. In the parts (a) and (b) of FIG. 3, "H" (high level) represents a conducting (ON) state and "L" (low level) represents a cut-off (OFF) state. As shown in the waveform diagrams of the parts (a) and (b) of FIG. 3, periods A1 and A2, during which both the u-phase upper switching element 6u and the u-phase lower switching element 7u are cut off, are set. Hereinafter, a simultaneous cut-off period such as shown by A1 and A2 in FIG. 3 is called the dead time. These dead times A1 and A2 absorb a time difference in operation time between, for example, upper and lower switching elements which rise or fall by a photocoupler for transmitting a PWM switching command and by a pre-drive circuit for driving switching elements. Accordingly, the dead times A1 and A2 are set at about several microseconds in order to avoid the destruction of switching elements due to simultaneous conduction.

Variation in the terminal voltage Vu when current flows in the direction as indicated with arrow B in FIG. 4 is shown in a part (c) of FIG. 3. Additionally, variation in the terminal voltage Vu when current flows in the direction as indicated with arrow C of FIG. 4 is shown in a part (d) of FIG. 3 and variation in the terminal voltage Vu when current changes from a negative direction (arrow's C direction) to a positive direction (arrow's B direction) is shown in a part (e) of FIG. 3.

Next, the reason why the terminal voltage Vu varies as shown in FIG. 3 will be described.

In the first place, a case, in which a positive current is flowing through the u-phase coil 3u of FIG. 3 in the direction as indicated with arrow B, is described. In this case, the voltage Vu detected by the voltage output circuit 10 exhibits a voltage waveform as shown in the part (c) of FIG. 3 that is substantially identical with one shown in the part (a) of FIG. 3. The reason will be explained below.

In the dead times A1 an A2 during which both the upper switching element 6u and the lower switching element 7u turn off, current keeps flowing in the direction as indicated with arrow B because of the continuity of current. At this instant, current flows in the direction as indicated with arrow D through the diode 8ud connected in reverse parallel with the switching element 7u, and current flows in the coil 3u in a positive direction. In this state, provided that supposed that a drop in voltage in the forward direction of the diode 8ud is 0 V, then the terminal voltage Vu is 0 V and the voltage in the dead time period is 0 V. Here, the collector-emitter saturation voltage of the switching elements 6u and 7u and the voltage drop in the forward direction of the diodes 8uu and 8ud are regarded as 0 V, for they are small with respect to the supply voltage E[V]. Additionally, in the parts (c)–(e) of FIG. 3, the delay between a PWM switching command shown in the part (a) of FIG. 3 and an actual switching operation shown in the part (c) of FIG. 3 is not taken into account for the sake of providing an easy understanding. However, it is practically necessary to take into account the fact that a dead time period in the actual operation as shown in the part (c) of FIG. 3 is delayed by an operation delay with respect to a PWM switching command shown in the part (a) of FIG. 3 from the computer. Further, actually, the voltage gradually rises and gradually falls; however, for the sake of easy understanding, in the parts (c)–(e) of FIG. 3 the rising and falling of the voltages is shown in a vertical manner and its variation is ignored. For reference, an actual voltage waveform corresponding to the one shown in the part (e) of FIG. 3 is illustrated in the part (f) of FIG. 3.

It is to be noted that voltages in the voltage waveforms shown in the parts (a) and (b) of FIG. 3 are either 0 V or 5 V because a control power supply of 5 V is applied to the switching element groups 6 and 7. In addition, the voltage value of the terminal voltage Vu at a power part shown in the part (c) of FIG. 3 is either 0 V or E[V].

Next, explanation will be made for a case, such that a current flows in the u-phase coil 3u in a negative direction, i.e., in the direction as indicated with arrow C (FIG. 4).

When a current flows through the coil 3u in a negative direction, the terminal voltage Vu has a waveform shown in the part (d) of FIG. 3. At this instant, current continues to flow through the diode 8uu in the direction as indicated with arrow E of FIG. 4, i.e., in a negative direction, during a dead time period. As a result, the terminal voltage Vu during the dead time period is E[V]. Accordingly, the then terminal voltage Vu has a waveform which is an positive/negative inversion of the voltage waveform of the lower switching element 7u shown in FIG. 3.

Next, an example case will be considered, in which, when the upper switching element 6u is in the conducting state (H) as shown in the part (a) of FIG. 3, a current (i.e., a u-phase current) flowing through the u-phase coil 3u changes from a negative direction to a positive direction.

A case is now elucidated, in which a u-phase current flows in the direction as indicated with arrow C in the period of the dead time A1, while on the other hand a u-phase current flows in the direction as indicated with arrow B in the period of the dead time A2. FIG. 5 is a waveform diagram illustrative of a state in which a current flowing in the u-phase coil 3u changes from a negative direction (i.e., the direction as indicated with arrow C of FIG. 4) to a positive direction (i.e., the direction as indicated with arrow B of FIG. 4), thereafter passing through a zero cross point. The voltage waveform of the terminal voltage Vu in the case shown in FIG. 5 becomes a waveform as shown in the part (e) of FIG. 3, and during the period of the dead time A1 the terminal voltage Vu is E[V], while during the period of the dead time A2 the terminal voltage Vu is 0 V. In the case current flowing in the coil 3 makes a change in its flow direction in the way as described above, there is voltage variation in the periods of the dead times A1 and A2.

In the motor control apparatus of the first embodiment, the current sign change detection part 11 detects, based on a PWM switching command from the switching element modulation circuit 9, voltages for the respective phases from the voltage output circuit 10 in synchronization with the timing of an actual dead time period. At this instant, when a voltage detected changes in sign, the current sign change detection part 11 provides a signal indicative of the fact that the sign of a phase current has changed (that is, the current has passed through the zero point).

In fact, based on the time when there occurs a change in the switching operation, the timing of detecting a voltage in a dead time period is, in consideration of a switching operation delay, delayed by such a delay amount. A detection timing is shown by arrow in the waveform diagram of the part (e) of FIG. 3.

Terminals voltages of the respective phases are detected in the way described above, and therefore, it is possible to detect a current zero cross point, namely a point of time when sign of current flowing in the coil 3 changes.

Next, away of controlling a motor with a zero cross signal, which is indicative of the time when a phase current passes through a zero cross point, will be described.

For the case of a surface magnet type rotor with a magnet disposed on a surface of the rotor 2, it has been known that motor efficiency is improved by controlling the phase of a phase current to agree with that of an induced voltage. Therefore, the controlling of making a phase current and an induced voltage agree in phase with each other is carried out.

Next, the first applied voltage control circuit 14 for establishing a correspondence in phase between a phase current and an induced voltage in the first embodiment will be described.

FIG. 6 is comprised of parts (a), (b), and (c), which are waveform diagrams illustrative of the phase current versus the induced voltage relationships. In FIG. 6, solid line indicates an applied voltage waveform, broken line indicates an induced voltage, and chain line or alternate long and short dashed line indicates a phase current. For the sake of providing an easy understanding, the voltage waveform of a sinusoidal phase applied voltage command provided from the first applied voltage control circuit 14 is shown in FIG. 6 as an applied voltage.

A waveform diagram, shown in the part (a) of FIG. 6, is a diagram illustrative of an ideally-controlled case in which a phase current and an induced voltage agree with each other in phase. The part (b) of FIG. 6 is a waveform diagram illustrative of a case in which a phase current is delayed with respect to an induced voltage. The part (c) of FIG. 6 is a waveform diagram illustrative of a case in which a phase current is advanced with respect to an induced voltage.

In FIG. 6, the difference in phase between an applied voltage and a phase current is represented by $\phi$. The state shown in the part (b) of FIG. 6 is greater in the phase difference $\phi$ with respect to the state shown in the part (a) of FIG. 6. The state shown in the part (c) of FIG. 6 is smaller in the phase difference $\phi$ with respect to the state shown in the part (a) of FIG. 6.

As described above, in the case that an induced voltage and a phase current disagree with each other in phase, the phase of the applied voltage and the phase of the phase current vary. Therefore, it becomes possible to perform control operations using such a phenomenon. In FIG. 6, an actual applied voltage is, as previously stated, is PWM switched by the switching element modulation circuit 9 and is applied to each of the switching elements with a dead time.

Note that, when the difference in phase between an induced voltage and a current is small, it is necessary to advance the phase of an applied voltage with respect to the phase of the phase current in consideration of an electrical time constant due to the resistance value and the inductance of the stator coil 3. Therefore, provided that the lead angle of an applied voltage with respect to a phase current is $\phi$ref, the ideal phase difference $\phi$ref between the phase current and the applied voltage when the phase current and an induced voltage are in phase can be preset, because it is uniquely determined by the speed and torque of the motor.

Based on the above-described concept, the first applied voltage control circuit 14 detects a phase difference $\phi$ between the zero cross timing of a phase applied voltage command provided from itself and the zero cross of a phase current provided from the current sign change detection part 11. Additionally, providing that the target phase difference between a voltage and a current when there is a correspondence in phase between an induced voltage and a phase current at a specified torque and speed at present is represented by $\phi$ref, then a phase error is calculated from the following equation (1).

$$\phi c = -(\phi ref - \phi) \qquad (1)$$

Next, providing that a time period required for shifting 60 electrical degrees, i.e., a 60 degree moving time, is expressed by T$\theta$60 deg(n); and providing that the previous 60 degree moving time is expressed by T$\theta$60 deg(n−1), then correction of a current 60 degree moving time T$\theta$60 deg(n) is given by the following equation (2). In the equation (2), (n) and (n−1) indicate a present value and a previous value, respectively.

$$T\theta 60\ \deg(n) = T\theta 60\ \deg(n-1)\{1 - K2 \cdot \phi c / 60\} \qquad (2)$$

where,
when, $K2 = K2'$, $\phi c \leq 0$; and
when, $K2 = 0.2 \cdot K2'$, $\phi c > 0$.

K2' is a correction gain (a phase error gain) of the 60 degree moving time, and which is the value of K2', ranges from about 0.05 to about 0.5 used in the first embodiment.

With respect to an applied voltage for the ideal induced voltage shown in the part (a) of FIG. 6, the state shown in the part (b) of FIG. 6 is delayed in applied voltage by 10 electrical degrees while the state shown in the part (c) of FIG. 6 is advanced. There appears a greater phase error in the delayed state shown in the part (b) of FIG. 6 in comparison with the advanced state shown in the part (c) of FIG. 6. Therefore, the gain will be set to a smaller value when increasing the voltage frequency. Here, for increasing the voltage frequency, the 60 degree moving time is set to a smaller value, while on the other hand, for decreasing the voltage frequency, the 60 degree moving time is set to a larger value. As a result of such arrangement, the stability of control can be enhanced against the behaviors of the non-linear phase error $\phi$c. Additionally, the value of the correction gain K2 affects response, so that, when response is not much required, the correction gain K2 should be set to a smaller value to provide a setting that gives importance to the stability.

Obtaining an internal estimated angle for each PWM cycle from the 60 electrical degree shift time Tθ60 deg(n) as in the following equations (3) and (4), has been known from, for example, the disclosure of the U.S. Pat. No. 5,729,102 Gazette.

$$\Delta\theta PWM = 60 \text{ deg} \times \Delta TPWM/T\theta 60 \text{ deg}(n) \quad (3)$$

$$\theta(m) = \theta(m-1) + \Delta\theta PWM \quad (4)$$

In the equation (3), ΔTPWM indicates the time of one PWM cycle. In the equation (4), ΔθPWM indicates an angle that shifts for one PWM cycle. These equations are calculated in the next cycle. In the first place, the equation (1), the equation (2), and the equation (3) are calculated every time and the phase error φc is obtained. Subsequently, based on a calculated ΔθPWM, the equation (4) is calculated for every PWM cycle to update the angle θ(m).

For the controlling of the 60 degree moving time for every 60 electrical degrees, the current sign change detection part 11 performs a current sign change detection operation on all the phases, i.e., the u-phase, the v-phase, and the w-phase, wherein the same processing as above is carried out.

Next, a voltage command value Vamp and a voltage phase command value α obtained by the proportional-plus-integral control of the speed error are provided from the voltage command part 20 for forwarding to the first applied voltage control circuit 14.

In the first applied voltage control circuit 14, in the case that the input voltage phase command value α is positive, the target phase difference φref of the foregoing equation (1) is set to a smaller value in order to advance the phase of an applied voltage with respect to the induced voltage. On the other hand, in the case that input voltage phase command value α is negative, the phase difference φref is set to a larger value on the basis of the voltage phase command value α. Subsequently, by making use of the voltage command value Vamp and the obtained estimated angle θ(n) found, sinusoidal command voltages Vu*, Vv*, and Vw* for the three phases are generated from the following equations (5), (6) and, (7):

$$Vu^* = Vamp \cdot \sin(\theta) \quad (5)$$

$$Vv^* = Vamp \cdot \sin(\theta - 2/3\pi) \quad (6)$$

$$Vw^* = Vamp \cdot \sin(\theta + 2/3\pi) \quad (7)$$

Next, the switching element modulation circuit 9 will be described.

The switching element modulation circuit 9 comprises a triangular wave comparator circuit (In-CPU calculation), a photocoupler, and a pre-drive circuit. Firstly, the switching element modulation circuit 9 performs, based on the sinusoidal command voltage provided from the first applied voltage control circuit 14, triangular wave comparison PWM method processing with the provision of a dead time. Subsequently, the switching element modulation circuit 9 drives the pre-drive circuit containing the photocoupler and other components and provides a conduction/cut-off signal for the switching elements groups 6 and 7 to each of the switching elements for the application of voltage.

The phase error φc is fed back and the 60 degree moving time Tθ60 deg(n) is calculated, so that a voltage amplitude and a voltage frequency according to a rotor position at present are fed into each of the switching elements. The controlling of the input voltage and frequency of each switching element is identical with the controlling of eliminating the error between an estimated position of the rotor 2 at present and an actual rotor position.

Generally, by controlling the phase of an induced voltage to agree with the phase of a current, copper loss will be reduced. Accordingly, the first applied voltage control circuit 14 performs control so that the current is in phase with the induced voltage, which makes it possible to provide high-efficiency, low-vibration, current-sensorless, and drive with an energization period near to 180 degrees as a wide-angle energization drive. Additionally, by setting the target phase difference φref to a smaller value at the time of voltage saturation, it is possible to expand the range of operation of the motor 1 by advancement of the current phase with respect to the induced voltage.

FIG. 6 is a graph showing a relationship between the applied voltage, induced voltage, and phase current when the induced voltage is sinusoidal, showing that, even when the induced voltage is trapezoidal in waveform including triple and harmonics, the same relationship as in the case of the sine wave shown in FIG. 6 holds and the same control can be carried out.

Although the switching element modulation circuit 9 has been described based on the triangular wave compare PWM method for making a comparison with a triangular wave, it is possible to employ other PWM methods such as a fixed pulse width method to detect a current sign change by making utilization of a dead time, and the same effects as obtained in the triangular wave compare PWM method are obtained.

Computation of the 60-degree moving time Tθ60 deg (n), which is executed in the first applied voltage control circuit 14, is carried out by integral action of the phase error φc as shown in the equation (2). However, as shown in the following equation, it is possible to calculate the 60-degree moving time Tθ60 deg(n) by taking a left term calculated in the equation (2) as an integral component TθI_60 deg(n) and by calculating a proportional component Tθp_60 deg (n), and by summing together both. As a result of such arrangement of including a proportional component in the arithmetic processing, the motor control stability is improved.

$$T\theta I\_60 \text{ deg}(n) = T\theta I\_60 \text{ deg}(n-1)\{1 - KI \cdot \phi c/60\} \quad (8)$$

Where,
when KI=KI', φc≦0; and
when KI=0.2·KI', φc>0.

$$T\theta p\_60 \text{ deg}(n) = T\theta I\_60 \text{ deg}(n-1)\{1 - KP \cdot \phi c/60\} \quad (9)$$

Where,
when KP=KP', φc≦0; and
when KP=0.2·KP', φc>0.

$$T\theta 60 \text{ deg}(n) = T\theta I\_60 \text{ deg}(n) + T\theta p\_60 \text{ deg}(n) \quad (10)$$

Likewise, when increasing the voltage frequency, motor control stability will be improved by setting a correction gain to a smaller value in comparison with when decreasing the voltage frequency.

Portions of the current sign change detection part 11, the first applied voltage control circuit 14, the voltage command part 20, and the switching element modulation circuit 9 in the first embodiment are actually implemented by a computer. Therefore, in the control apparatus of the first embodiment a terminal voltage provided from the voltage output circuit 10 cannot be taken in directly. Accordingly, a terminal voltage is voltage divided, then is compared with a preset set value, and then is binarized. This binarized value is taken into the computer as digital data via an I/O port built in the computer.

Subsequently, a change in the current sign is detected in the computer and thereafter calculations of the foregoing equations (1), (2), (3), and (4) are performed, and only actual PWM switching ON/OFF signals are provided through the I/O port. An example of the actual circuit structure will be explained in the third embodiment which is described later.

In the motor control apparatus of the first embodiment, a structure is employed in which a current zero cross is detected in two periods, namely the dead times A1 and A2. However, the present invention is not limited to such a structure, and therefore, a different structure may be employed, such that voltage is detected either in the dead time A1 or in the dead time A2, or for every two cycles, thereby to detect a change in the current.

By detecting a voltage in a dead time, changes in the current sign can be detected at an early stage. However, when the PWM frequency is high or when the speed of the rotor 2 is slow, it is possible to perform control without carrying out a voltage detection operation for every dead time.

It is to be noted that, although in the motor control apparatus of the first embodiment, there is employed a structure for the detecting of changes in the current sign for the three phases, it is possible to detect a change in the current sign for a single phase (e.g., the u-phase). In such a case, the number of times control is performed per 360 electrical degrees is reduced, but it is possible to perform control when the variation in speed is small. Like such a case of detecting a change in the current sign for a single phase only, the number of times T$\theta$60 deg(n) calculated is reduced and the voltage output circuit 10 is required for only one phase, thereby providing reductions of the costs.

In the motor control apparatus of the first embodiment, as already described, in response to a switching operation command from the computer the switching element groups 6 and 7 actually operate, and application of terminal voltages is delayed. To cope with this, it is necessary to detect a voltage in a dead time period in an actual operation.

Figure 7:
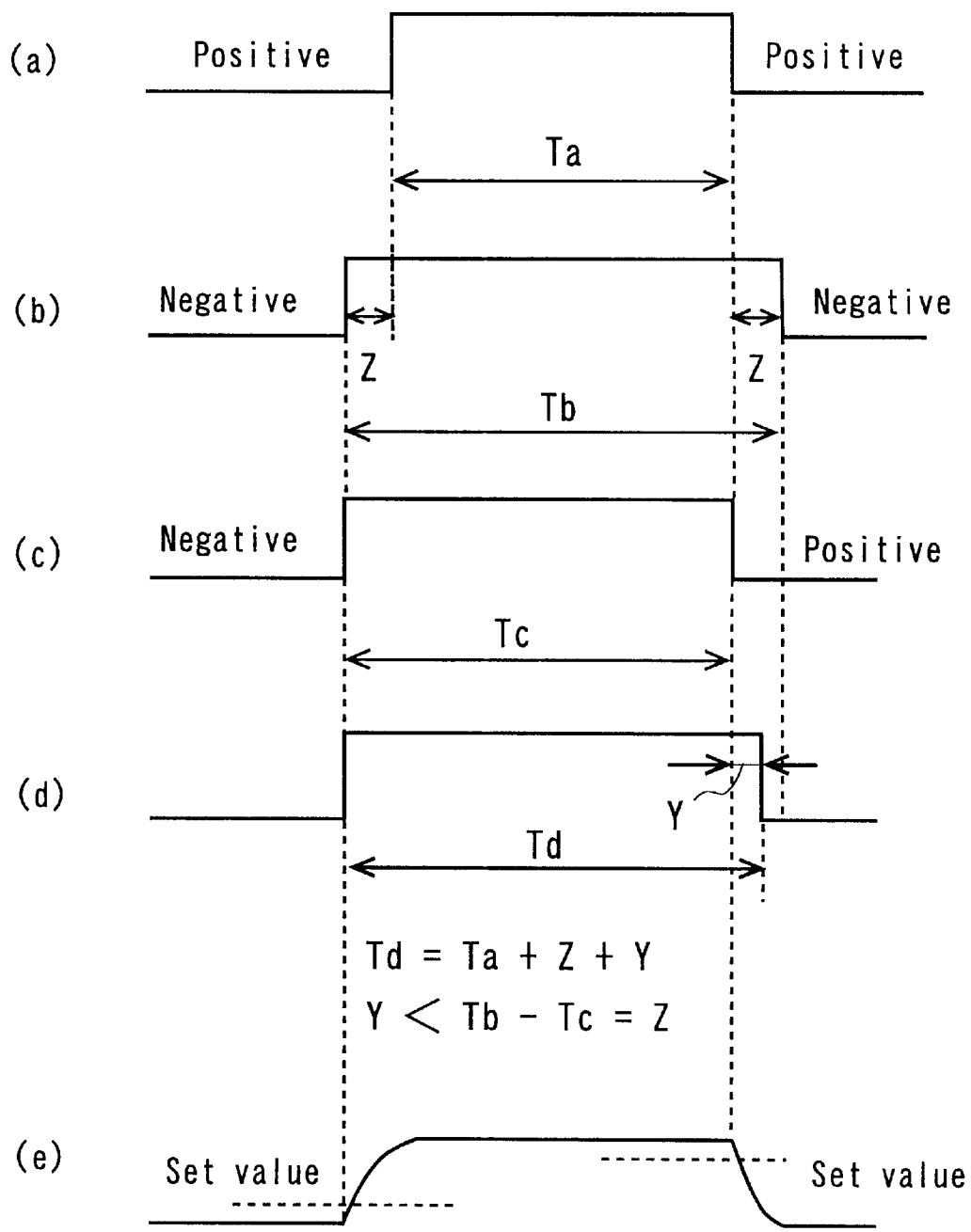
FIG. 7 shows waveform diagrams of coil terminal voltages in the first embodiment. A part (a) of FIG. 7 is a waveform diagram illustrative of a terminal voltage when current in the switching element 6u flows in a positive direction in the first embodiment and a part (b) of FIG. 7 is a waveform diagram illustrative of a terminal voltage when current flows in a negative direction in the first embodiment. A part (c) of FIG. 7 is a waveform diagram illustrative of a terminal voltage when current flow changes from a negative direction to a positive direction in the first embodiment, a part (d) of FIG. 7 is a diagram depicting a reference period for the deciding of a change in the current sign in a terminal voltage waveform when current flow changes from a negative direction to a positive direction in the first embodiment, and a part (e) of FIG. 7 is a waveform diagram illustrative of an actual terminal voltage Vu when current flow changes from a negative direction to a positive direction in the first embodiment.

Next, a control method will be described which requires no matching of the timing of detecting a voltage with a dead time in the current sign change detection part 11. FIG. 7 is a waveform diagram for the description of such a control method which requires no matching of the timing of detecting a voltage with a dead time.

In the first place, a case will be described, in which current flow in the coil 3 changes from a negative direction to a positive direction.

A part (a) of FIG. 7 shows an actual terminal voltage when current flows in a positive direction and continues to flow in that direction, for example, when the ON command period (high period) of the switching element 6$u$ of the u-phase is represented by Ta. A part (b) of FIG. 7 shows a period Tb for an actual terminal voltage when the ON command period of the u-phase switching element 6$u$ is also Ta when current flows in a negative direction and continues to flow in that direction. A part (c) of FIG. 7 shows an actual terminal voltage when the ON command period of the switching element 6$u$ is Ta when current flow changes from a negative direction to a positive direction.

Referring to FIG. 7, the terminal voltage ON period Tb (shown in the case of the part (b) of FIG. 7 in which current flows in a negative direction) is longer than the ON command period Ta shown in the part (a) of FIG. 7 by an amount twice a dead time period Z, that is, Tb=Ta+2Z holds. On the other hand, the terminal voltage ON period Tc (shown in the case of the part (c) of FIG. 7 in which current flow changes from a negative direction to a positive direction) is longer than the ON command period Ta of the part (a) of FIG. 7 by an amount equal to one dead time period Z, that is, Tc=Ta+Z holds.

A part (d) of FIG. 7 shows a reference period Td for the deciding of a change in the current. This reference period Td is found by calculation of Td=Ta+Z+Y in the current sign change detection part 11 by the use of a time Y shorter than the dead time period Z and the variable ON command period Ta. In the way described above, the reference period Td is prepared in the current sign change detection part 11 on the basis of the ON command period Ta provided from the switching element modulation circuit 9.

The reference period Td is compared with a HIGH period Tre of the terminal voltage actually provided from the voltage output circuit 10. The current sign change detection part 11 detects a change in the current sign by making such a judgement that the sign of a current changes from a negative direction to a positive direction if there is a change from the state of Tre >Td to the state of Tre$\leq$Td. The setting of the reference period Td in the way described above is particularly useful where current flow changes from a negative direction to a positive direction.

On the other hand, a case will be described, such that current changes from a positive direction to a negative direction. When there is a change from one state (in which a current flows in a positive direction and the HIGH period is Tre=Ta) to another state (in which current flow changes to a negative direction), it is possible to quickly detect a change flow change from a positive direction to a negative direction by setting the reference period at Td=Ta+Y.

When the reference period Td is set, as one set value, at Td=Ta+Z, there may occur a delay of one cycle until the sign of a current is detected. However, it is possible to detect a change in the sign of a current.

A part (e) of FIG. 7 shows a voltage waveform of the actual terminal voltage Vu when a small current flows in a positive direction. Owing to the characteristic of the switching elements, variation in the voltage actually applied becomes slow when a current is a small even before there is a change in the current sign. Accordingly, as shown in the part (e) of FIG. 7, the setting value of a comparator when a computer is used for detecting a voltage is set low when there is a change in the voltage from zero to a positive direction, while it is set high when there is a change in the voltage from a positive direction to zero. By setting the comparator in the way described above, the accuracy of detection of changes in the current sign is increased.

It is to be noted that the current sign change detection part 11 provides the same effects even when using other methods capable of detecting a change in the current sign by making utilization of a detected value of the terminal voltage.

The current sign change detection part 11 of the first embodiment does not continuously detect a current zero cross, but it detects changes in the current sign, only in the dead time period. Because of this, when (i) the rotation speed of the rotor 2 is high, (ii) the number of times a switching operation is carried out is low, (iii) and the number of dead times is small, the detection error becomes greater when current zero-crosses. Because it is impossible to detect the instant when a current actually zero-crosses within a PWM half period. As a result, an angle error is produced by an angle for which the rotor 2 rotates in the maximum PWM half period. Therefore, by increasing the PWM frequency, it becomes possible to diminish the angle error. However, there is the problem that the upper limit of the PWM frequency is limited owing to leakage current proportional to the number of times a switching operation is carried out.

Accordingly, to provide a solution to the above-described drawback, a switching element modulation circuit is provided as another embodiment so that the number of times a conduction/cut-off switching operation is performed on upper and lower switching elements of a specific phase to which the sign of a current changes is set greater than the number of times a conduction/cut-off switching operation is performed on switching elements of other phases.

FIG. 8 comprises of waveform diagrams illustrative of switching signals of PWM switching commands of respective phases from the switching element modulation circuit 9. A part (a) of FIG. 8 depicts a switching signal for an upper switching element of the u-phase. A part (b) of FIG. 8 depicts a switching signal for an upper switching element of the v-phase. A part (c) of FIG. 8 depicts a switching signal for an upper switching element of the w-phase.

A part (d) of FIG. 8 shows u-phase, v-phase, and w-phase current waveforms when the rotation direction is fixed. When the rotation direction is fixed, the order in which the zero crossing of the u-phase current, the v-phase current, and the w-phase current takes place is designated, as shown in the part (d) of FIG. 8. Therefore, as shown in the part (d) of FIG. 8, in a period T from the time the zero crossing of a u-phase current is detected to the time a w-phase current zero crosses next, the number of times a switching operation on the w-phase is carried out is set twice the number of times a switching operation on the u-phase of the part (a) of FIG. 8 is carried out and the number of times a switching operation on the v-phase of the part (b) of FIG. 8, as shown in the part (c) of FIG. 8. As described above, increasing the number of times a switching operation on a particular phase is carried out improves the angle accuracy of detecting the zero crossing of a current.

Upon detection of the zero crossing of the w-phase current, the switching element modulation circuit 9 causes the switching frequency of the w-phase current to return to its initial value and thereafter doubles only the switching frequency of the v-phase current that will zero cross next. The number of times of switching operation in the case that the switching frequency of only a specified phase is doubled is smaller in comparison with another case that all of the three phases are set to be two times the PWM frequency. As a result, the degree of increase in the leakage current is small, and the angle accuracy at the time of detecting the zero-crossing of a current is improved.

The switching frequency may be doubled only in a period Tshort shown in the part (d) of FIG. 8 in which a current easily predictable from the equations (3) and (4) is brought in the vicinity of zero.

The motor control apparatus of the first embodiment has been described on the example applied to the Permanent Magnet Synchronous Motor, hereinafter will be abbreviated PMSM, having the rotor 2 which is provided with a magnet. However, the motor control apparatus of the present invention can provide motor control in the same way that the motor control apparatus of the first embodiment does, for magnet-less synchronous reluctance motors (SynRMs) and induction motors. For instance, for the case of induction motors, the voltage command part 20 feeds a previous voltage command value to the first applied voltage control circuit 14. Thereafter, the first applied voltage control circuit 14 changes, based on the phase error φc given by the equation (1), the amplitude of an applied voltage from the voltage command part 20. In the PMSM, the 60 degree moving time (the voltage frequency) is varied; however, for the case of induction motors the voltage frequency is not varied,) and the switching element modulation circuit 9 makes a comparison between a phase voltage and a triangular wave, thereby controlling switching elements for induction motor control. Accordingly, also in this case, it is possible to perform voltage control on the basis of the difference in phase between a current sign change timing provided from the current sign change detection part 11 and an applied voltage.

In addition, because the current sign change detection means 11, which has been described in the first embodiment, is able to detect whether a current is positive or negative, it is possible to perform correction on a known dead time. The dead time correction is that, when a current is positive, an actual applied voltage in a positive direction becomes smaller in comparison with when a current is negative. Therefore, according to a current sign provided from the current sign change detection means 11, a correction voltage V α is added to or subtracted from each of phase applied voltage command values (Vu*, Vv*, Vw*) for voltage correction, as shown in the following equations (11) and (12). The following equations (11) and (12) show how the phase applied voltage command value (Vu*) is corrected when the sign of a current of the u-phase is positive and when the u-phase current sign is negative.

$$\text{When } iu \geq 0, Vu^* = Vu^* + V\alpha \tag{11},$$

and $$\text{when } iu < 0, Vu^* = Vu^* - V\alpha \tag{12}.$$

The equations (11) and (12) each indicate a dead time correction for only one of the three phases. Actually, corrections for the three phases are carried out. By virtue of execution of such dead time correction, it is possible to provide reduction of the current deformation and further it becomes possible to provide reduction of the vibration to a further extent.

In the motor control apparatus of the first embodiment, the timing of the zero crossing of a current is sensed by detection of a terminal voltage at a dead time. Thereafter, the applied voltage (the voltage amplitude/frequency) to the inverter 4 is controlled such that the difference in phase between a current zero cross and an induced voltage zero cross becomes a set value. As described above, the motor control apparatus of the first embodiment achieves low-vibration, high-efficiency sinusoidal voltage drive, only by terminal voltage detection.

Second Embodiment

Next, a motor control apparatus and a motor unit having the same in accordance with a second embodiment of the present invention will be described. In the motor control apparatus of the second embodiment, the terminal voltage is detected in a dead time for the detecting of a current zero cross timing. At the time when a current zero crosses, switching is cut off to detect an induced voltage. Then, based upon the detected induced voltage, the applied voltage (voltage amplitude/voltage frequency) is controlled. Since the motor control apparatus of the second embodiment is constructed so as to perform a cut-off operation when a current zero crosses, it accordingly achieves low-vibration, high-efficiency, drive with an energization period near to 180 degrees and a shortened cut-off period. Hereinafter, a control method used in the motor control apparatus of the second embodiment will be described by making reference to the drawings.

Figure 9:
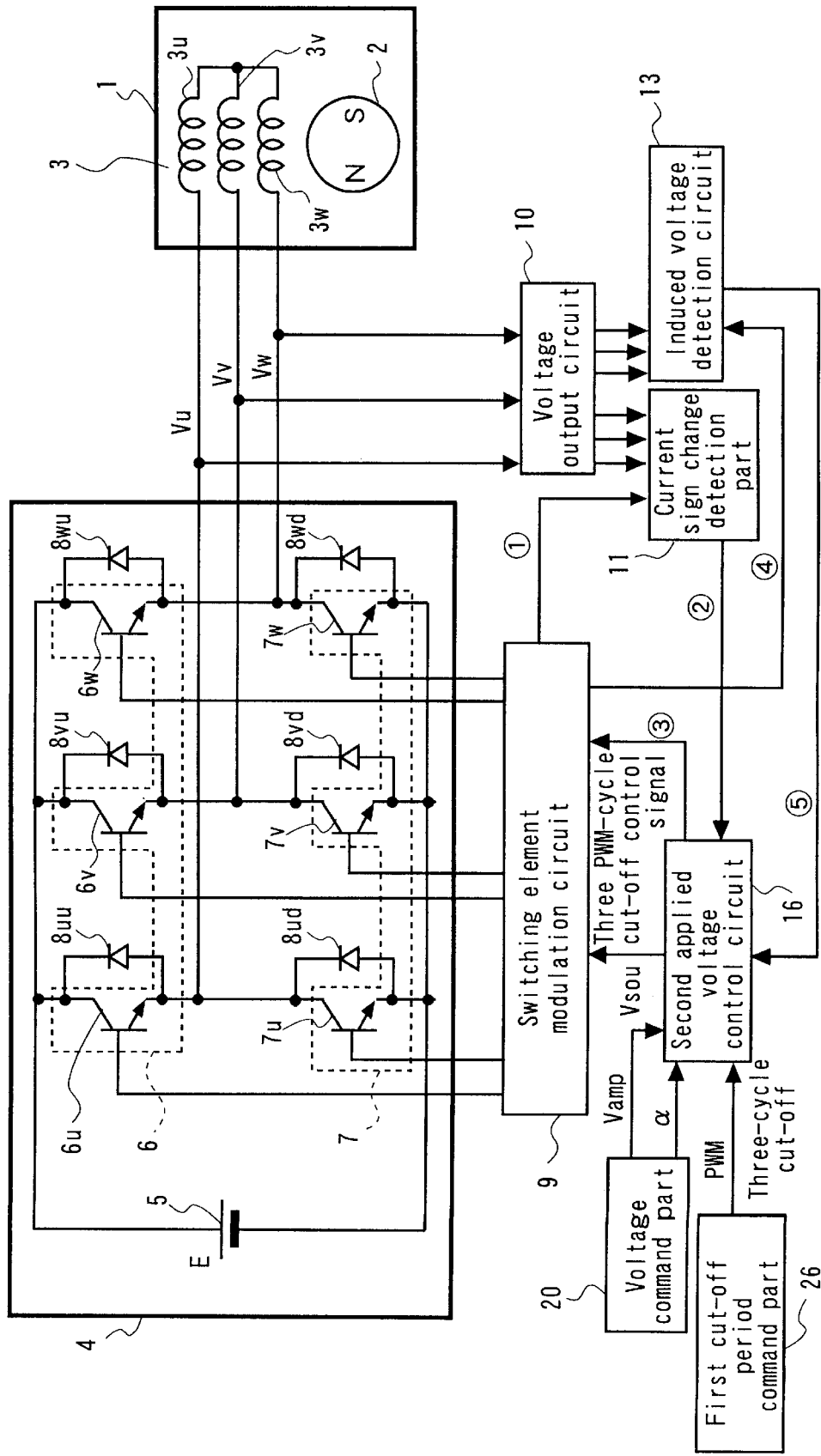
FIG. 9 is a block diagram showing the structure of a motor unit in a second embodiment of the present invention.

FIG. 9 is a block diagram showing the structure of a motor and a motor unit including a motor control apparatus.

In the description of the second embodiment, similar reference numerals have been designated similar to the elements of the above-described first embodiment, in FIG. 9, and hence, the description of such elements will be omitted. The order of processing in the control apparatus of the second embodiment is indicated by numerals ①–⑤ in FIG. 9.

A motor 1 has stators (not shown) and a rotor 2, and a coil 3 (3u, 3v, 3w), through which a phase current flows, is wound around each of the stators. An inverter 4 is provided with a direct current power source 5, an upper switching element group 6 (6u, 6v, 6w), and a lower switching element group 7 (7u, 7v, 7w), the upper and lower switching element groups 6 and 7 being three-phase bridge constructed, and diodes 8uu, 8vu, 8wu, 8ud, 8vd, 8wd connected in reverse parallel with the switching elements 6u, 6v, 6w, 7u, 7v, 7w, respectively. The upper and lower switching element groups 6 and 7 are coupled to a switching element modulation circuit 9 to be controlled.

The motor control apparatus of the second embodiment is provided with a voltage output circuit 10, a current sign change detection part 11, an induced voltage detection circuit 13 which is an induced voltage detection means, a second applied voltage control circuit 16 which is a second applied voltage control means, a voltage command part 20, and a first cut-off period command part 26 which is a first cut-off period command means.

Hereinafter, operations in the motor control apparatus of the second embodiment will be described in terms of the u-phase as an example phase.

As in the first embodiment, the current sign change detection part 11 detects terminal voltages (Vu, Vv, Vw) from the voltage output circuit 10 in synchronisation (①) with the timing of a dead time period. When a detected terminal voltage changes, it is decided that there is a phase current zero cross, and the current sign change detection part 11 outputs (②) a current change signal. At the moment when the current sign change detection part 11 provides a current change signal for the u-phase current, the u-phase current is in the vicinity of zero, therefore being very small.

Accordingly, when the current change signal is provided, the second applied voltage control circuit 16 outputs (③), based on a cut-off control period set in the first cut-off period command part 26, a cut-off control signal which inhibits the switching operation of the u-phase upper and lower switching elements 6u and 7u for about three straight PWM cycles, to the switching element modulation circuit 9. The switching element modulation circuit 9, to which the cut-off control signal has been input, cuts off the switching elements. In such a cut-off for about three PWM cycles, the u-phase current is brought back to zero by the first two PWM cycles in the cut-off control period. Then, in the period of a subsequent PWM cycle, the induced voltage detection circuit 13 detects the induced voltage Vu of the u-phase by sensing a voltage from the voltage output circuit 10 at the following timing.

Detection of an induced voltage is output when the upper switching element 6v of the v-phase and the lower switching element 7w of the w-phase are conducting, or when the upper switching element 6w of the w-phase and the lower switching element 7v of the v-phase are conducting. Because of this, the induced voltage detection circuit 13, working (④) with the switching element modulation circuit 9, detects an induced voltage. The induced voltage thus detected is fed (⑤) to the second applied voltage control circuit 16.

When the number of motor poles is four, the number of revolution is 300 rpm, and the triangular wave frequency is 15 kHz, cutting off PWM for three cycles means a cut-off period of seven degrees, resulting in 173 degree energization in the 180 degree period.

Next, a motor control method in the second embodiment will be described.

As described in the foregoing first embodiment, for the case of surface magnet type rotors, the phase current is controlled in such a way as to substantially correspond to the phase of an induced voltage detected.

Figure 10:
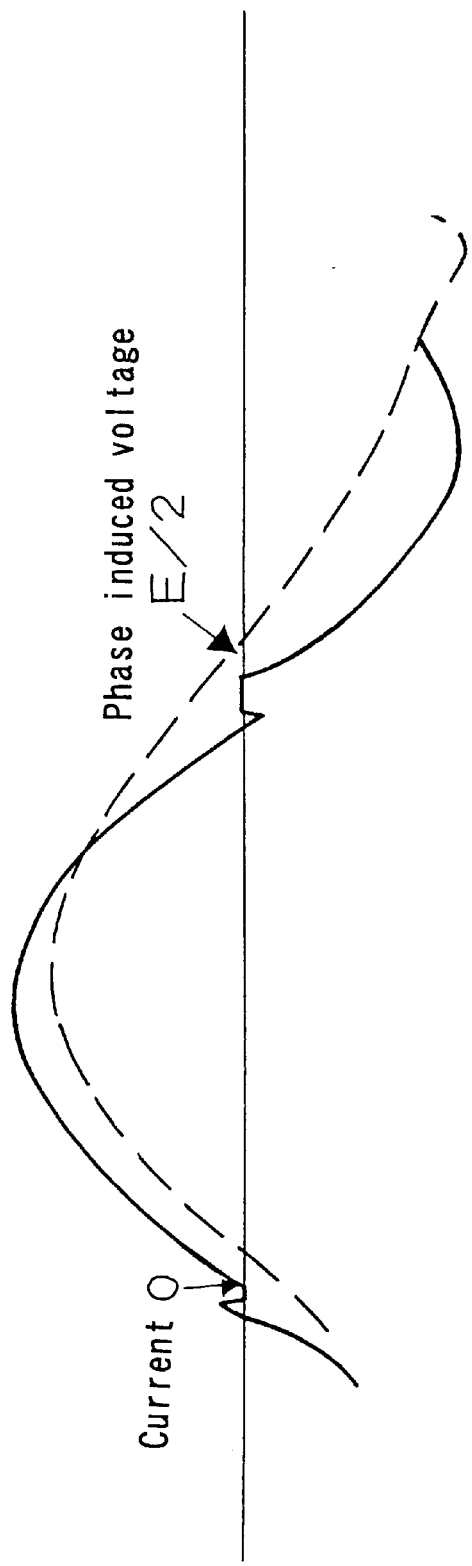
FIG. 10 is a waveform diagram showing the phase of a phase current and the phase of a phase induced voltage in the second embodiment.

FIG. 10 shows waveforms of a phase current and a phase induced voltage. As shown in FIG. 10, in the case that an induced voltage, detected at the timing that a current of the u-phase changes from a negative direction to a positive direction, falls below ½ of a supply voltage E, this indicates that the current phase is advanced with respect to the induced voltage. In this case, it is necessary to perform control to delay the application of voltage to make the phase current agree with the induced voltage. On the other hand, in the case that an induced voltage is in excess of ½ of the supply voltage E at the timing that a phase current changes from a positive direction to a negative direction, this also indicates that the current phase is advanced with respect to the induced voltage. Because of this, by delaying the application of voltage, the phase current is controlled to correspond to the induced voltage.

Contrary to the above, in the case that an induced voltage is in excess of ½ of the supply voltage E at the timing that a phase current changes from a negative direction to a positive direction, or in the case that an induced voltage falls below ½ of the supply voltage E at the timing that a phase current changes from a positive direction to a negative direction, such a case indicates that the phase current is delayed with respect to the induced voltage. Because of this, control to advance the application of voltage (i.e., control for increasing the frequency) is carried out.

By virtue of the controlling of the application of voltage in the way described above, the second applied voltage control circuit 16 performs, according to the induced voltage detected by the induced voltage detection circuit 13, correction of the 60 degree moving time, which will be described below.

The induced voltage detection circuit 13 detects an induced voltage in the form of an analog voltage. Where (i) the difference between a detected induced voltage and E/2 is ebemf, (ii) the effective value of a phase induced voltage at 1000 rpm is er[V], (iii) and the number of revolution at present is ω rpm, a phase shift amount φbc of the current phase on the basis of the induced voltage is calculated by the following equation (13).

$$\phi bc = K3 \cdot \sin^{-1}\{707 ebemf/(\omega \cdot er)\} \tag{13}$$

In the equation (13), when current flow changes from a positive direction to a negative direction, K3=−1, and on the other hand, when current flow changes from a negative direction to a positive direction, K3=1.

Next, when the time taken for the passage of 60 electrical degrees is Tθ60 deg(n), correction of the 60 degree moving time can be carried out by the following equation (14).

$$T\theta 60\ \deg(n) = T\theta 60\ \deg(n-1)\{1 - K5 \cdot \phi bc/60\} \tag{14}$$

In the equation (14), K5 is a correction gain for the 60 degree moving time, and as the value of K5, values ranging from about 0.05 to about 0.5 are used.

In the case that the phase of a current is advanced with respect to that of an induced voltage, then the 60 degree moving time of a voltage that is applied is delayed. By changing the frequency of an applied voltage, it becomes possible to make a change in the 60 degree moving time, thereby to make it possible to perform applied voltage control such that an induced voltage and a current agree in phase with each other.

Next, as in the first embodiment, the equations (3) and (4) are used to prepare angles for each PWM cycle.

Further, as in the first embodiment, the voltage command part 20 outputs the voltage command value Vamp and the voltage lead angle α to the second applied voltage control circuit 16. When the motor 1 is implemented by a surface magnet type synchronous motor (SPM), the voltage lead angle (α=0) is input.

With the input voltage command value Vamp and the estimated angle θ(n), the second applied voltage control circuit 16 finds sinusoidal command voltages for the three phases, i.e., Vu*, Vv*, and Vw* and provides them to the switching element modulation circuit 9.

Then, in the period during which the second applied voltage control circuit 16 provides a conduction control signal, the switching element modulation circuit 9 performs a PWM switching operation on a corresponding phase. In other words, the switching element modulation circuit 9 carries out a triangular wave compare PWM method for comparing a sinusoidal command voltage and a triangular wave, thereby to generate a PWM switching command. Further, the switching element modulation circuit 9 applies a conduction/cut-off signal for the PWM switching command including a dead time to each of the switching elements in the switching element groups 6 and 7 for actual application of voltages to each coil 3 of the motor 1.

In these circumstances, based on a detected voltage from the voltage output circuit 10 during a switching element dead time period, the zero crossing of a current of a specific phase is detected by the current sign change detection part 11. Then, the corresponding phase will be cut off continuously just for a period of time set by the first cut-off period command part 26. By such a cut-off, the current amounts to zero, thereby producing a state in which an induced voltage becomes detectable by the induced voltage detection circuit 13.

Making utilization of the detected induced voltage value, the second applied voltage control circuit 16 performs control of the 60 degree moving time.

In accordance with the motor control apparatus of the second embodiment constructed and operating as described above, it becomes possible to shorten a current zero period to provide energization, whereby current-sensorless, low-cost, low-vibration, high-efficiency, and drive with an energization period near to 180 degrees as a wide-angle energization drive can be achieved.

It is needless to say that, in the second embodiment, the operation that the first cut-off period command part 26 gives a cut-off control period is the same as providing an energization control period.

In a motor in which a magnet is embedded in the rotor 2 (hereinafter, abbreviated IPM), it is well known that higher motor efficiency can be obtained when the current phase is somewhat delayed with respect to the induced voltage phase. Therefore, for the case of IPMs, the phase shift amount φbc of a current phase is calculated according to the voltage lead angle α (α<0) provided from the voltage command part 20 on the basis of the number of revolution and the torque. In this case, in order that the current phase may be delayed to some extent, the second applied voltage control circuit 16 calculates the phase shift amount φbc from the following equation (15) which introduces an offset phase βos in place of the foregoing equation (13).

$$\phi bc = K6 \cdot \sin^{-1} \{707ebemf/(\omega \cdot er)\} - \beta os \tag{15}$$

In the equation (15), when current flow changes from a positive direction to a negative direction, K6=−1, while on the other hand, when current flow changes from a negative direction to a positive direction, K6=1.

Then, by the use of a value of the phase shift amount φbc calculated in the equation (15), calculations of the equations (2) to (7) are replaced by φc=φbc and carried out in the same way as in the first embodiment, which makes it possible to control the IPM at high efficiency.

In the forgoing second embodiment, a case, in which an induced voltage can be detected as an analog voltage, has been described; however, when a change in the speed of the rotor 2 is small, only a signal regarding the phase lead or lag of a current that the induced voltage detection circuit 13 can detect from the sign of an induced voltage is obtained. In such a case, with binarized induced voltage information, the second applied voltage control circuit 16 performs a calculation over a 60 degree period by the following equation (16) in place of the equation (14).

$$T\theta 60 \deg(n) = T\theta 60 \deg(n-1)\{1 - K3 \cdot K4 \cdot K5\} \tag{16}$$

In the equation (16), when current flow changes from a positive direction to a negative direction, K3=−1, while when current flow changes from a negative direction to a positive direction, K3=1. On the other hand, when current flow changes from a positive direction to a negative direction, K4=31 1, while when current flow changes from a negative direction to a positive direction, K4=1. K5 is a correction gain for the 60 degree moving time, and when making correction of about 0.3 to about 3 degrees of the 60 degrees, values ranging from about 0.005 to about 0.05 are used as the value of K5.

By performing operations after the equation (16) in the same way that these in the first embodiment are carried out, the motor control of the second embodiment has the same effects as the first embodiment.

Third Embodiment

A motor control apparatus and a motor unit having the motor control apparatus in accordance with a third embodiment of the present invention will be described below. The motor control apparatus of the foregoing second embodiment is constructed such that switching elements are cut off after the zero crossing of a current, to detect an induced voltage. On the other hand, the motor control apparatus of the third embodiment is constructed such that when a current is flowing, switching elements are cut off to bring the current back to zero. The motor control apparatus of the third embodiment achieves low vibration/high efficiency by drive with an energization period near to 180 degrees by resuming switching operations immediately after detection of an induced voltage. A control method of an energization angle near to 180 degrees in the motor control apparatus of the third embodiment will be described below.

Figure 11:
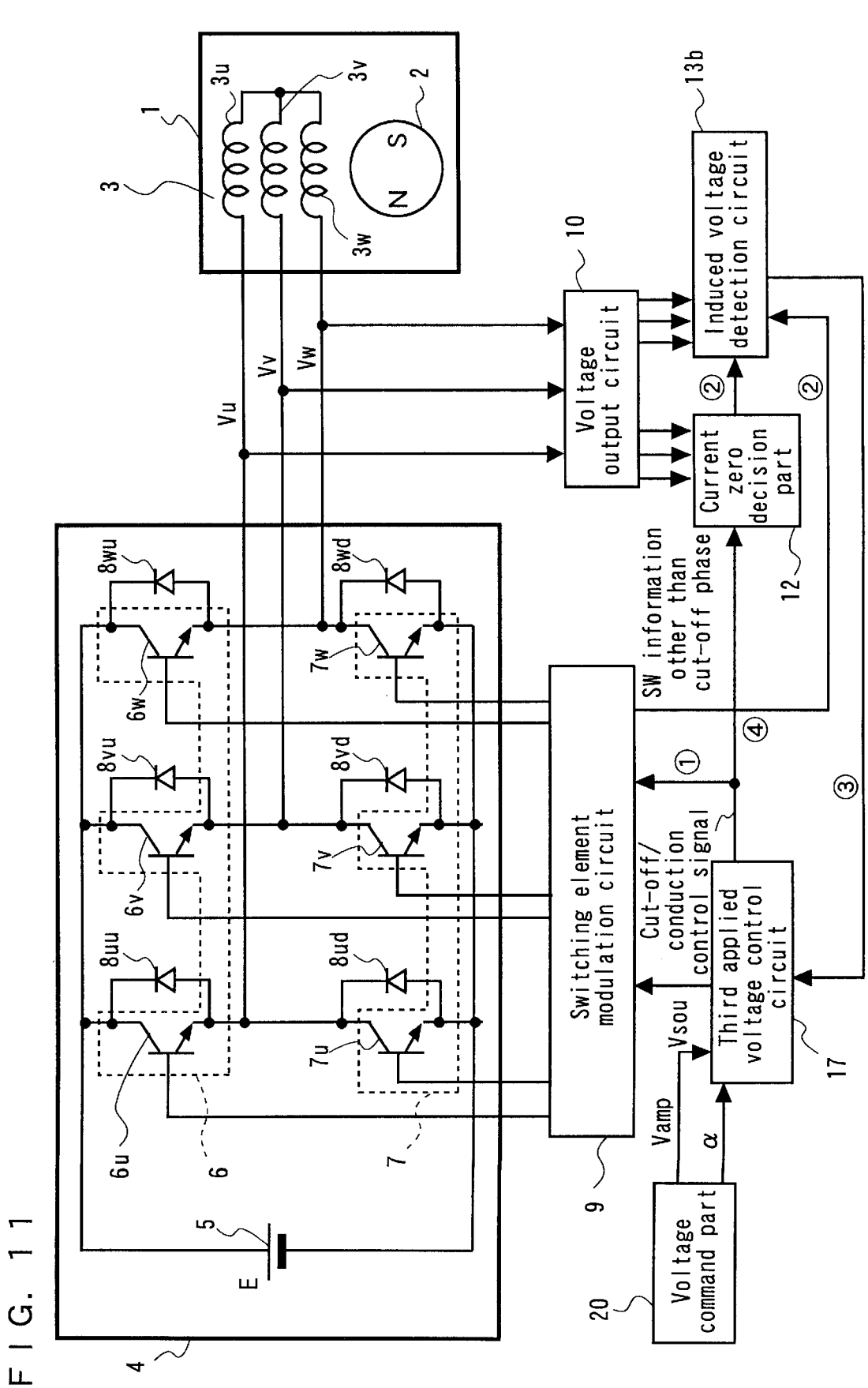
FIG. 11 illustrates in block diagram form the structure of a motor unit in a third embodiment of the present invention.

FIG. 11 is a block diagram showing the structure of a motor unit having a motor and a motor control apparatus.

In the description of the third embodiment, similar reference numerals have been designated similar to the elements of the above-described first embodiment, in FIG. 11, and hence, the description of such elements are omitted. The order of processing in the control apparatus of the third embodiment is indicated by numerals ①–④ in FIG. 11.

As in the first embodiment, a motor 1 of the third embodiment has stators (not shown in the figure) and a rotor 2, wherein a coil 3 (3u, 3v, 3w), through which phase current flows, is wound around each stator. An inverter 4 is provided with a direct current power source 5, an upper switching element group 6 comprising 6u, 6v, 6w, a lower switching element group 7 comprising 7u, 7v, 7w, the upper and lower switching element groups 6 and 7 being three-phase-bridge constructed, and diodes 8uu, 8vu, 8wu, 8ud, 8vd, and 8wd connected in reverse parallel with the switching elements 6u, 6v, 6w, 7u, 7v and 7w, respectively. The upper switching element group 6 and the lower switching element group 7 are coupled to the switching element modulation circuit 9 to be controlled.

In addition to the above, the motor control apparatus of the third embodiment is provided with a voltage output circuit 10, a current zero decision part 12 which is a current zero decision means, an induced voltage detection circuit 13b, a third applied voltage control circuit 17 which is a third applied voltage control means, and a voltage command part 20.

Operations in the motor control apparatus of the third embodiment will be described below.

Figure 12:
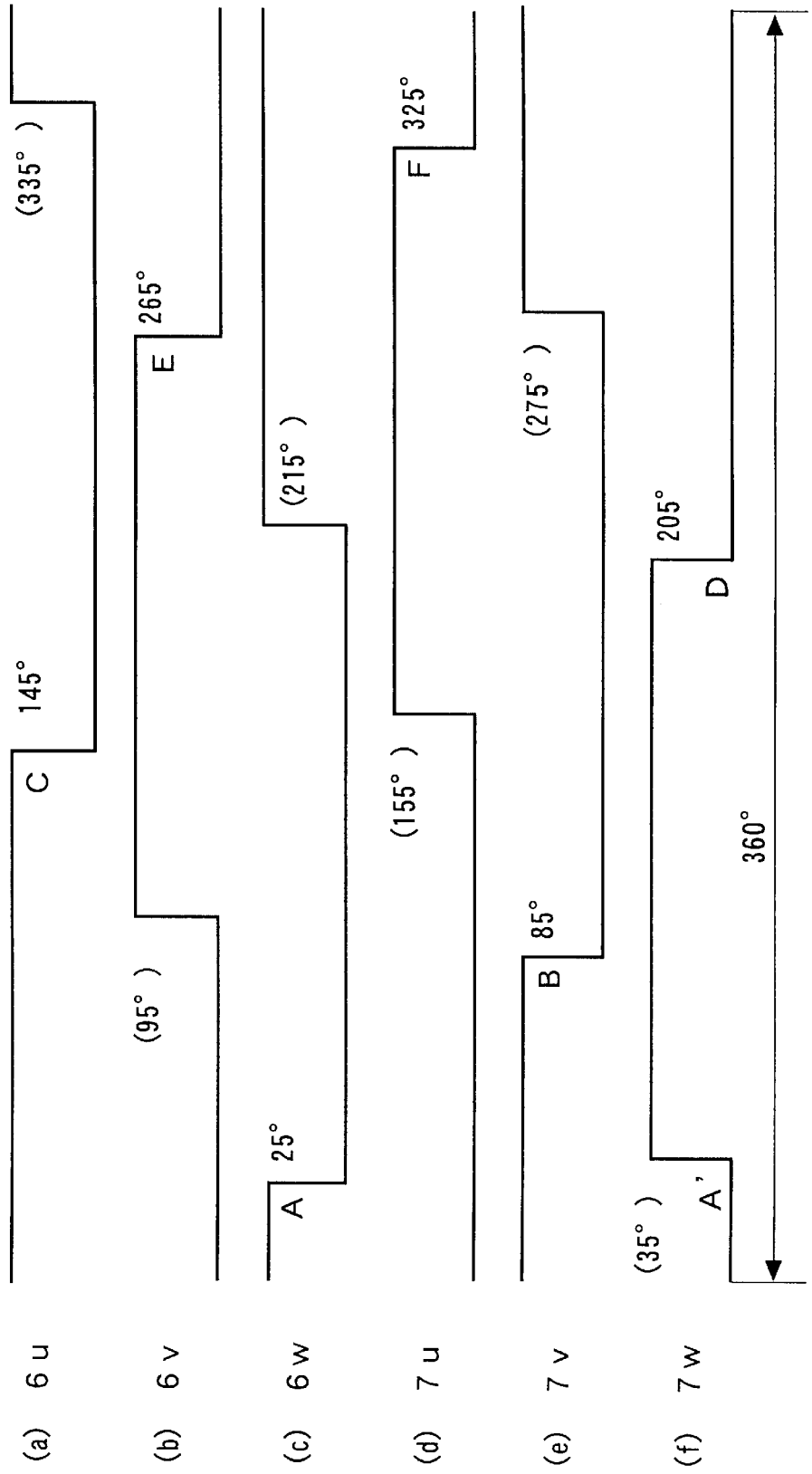
FIG. 12 is a diagram showing the conduction/cut-off timings of the upper switching elements 6u, 6v, and 6w and the lower switching elements 7u, 7v, and 7w for an energization angle near to 180 degrees in the third embodiment.

In the first place, a concept of the current zero decision in the third embodiment will be discussed by reference to FIGS. 12 and 13. Parts (a)–(f) of FIG. 12 are diagrams illustrative of timings of the conduction/cut-off control of the upper and lower switching elements 6u, 6v, 6w, 7u, 7v, and 7w in an energization angle near to 180 degrees. In FIG. 12, the switching elements enter the switching-enabled state, only in a period during which an input signal to each switching element is at a high level.

As in the case described in the prior art description part, a case, in which only the upper switching elements 6u, 6v, and 6w are PWM switched, will be described below.

In the high level period, PWM switching is performed on the upper switching elements 6u, 6v, and 6w, which is not shown in the figure. At this instant, the lower switching elements 7u, 7v, and 7w remain conductive in the high level period. Such switching element drive control is carried out based on the conduction/cut-off control signal from the third applied voltage control circuit 17. As can be seen from the above, the switching elements do not always conduct when the third applied voltage control circuit 17 provides a conduction control signal. In other words, that the third applied voltage control circuit 17 sends a conduction control signal to the switching element modulation circuit 9 means the provision of a control signal indicative of the enabling or disabling of a switching operation for a given period of time to the switching element modulation circuit 9. The controlling of conduction/cut-off operations of the switching element groups 6 and 7 in an actual PWM cycle is carried out in the switching element modulation circuit 9.

In the third embodiment, the timing of cut-off control of each phase is generated using a computer timer from a 60 degree moving time, as in the foregoing first and second embodiments. For example, it is obvious from FIG. 12 that, after the w-phase switching element 6w is cut off (A: 25 degrees), the switching element 7v is cut off (B: 85 degrees) after the passage of 60 electrical degrees.

Figure 13:
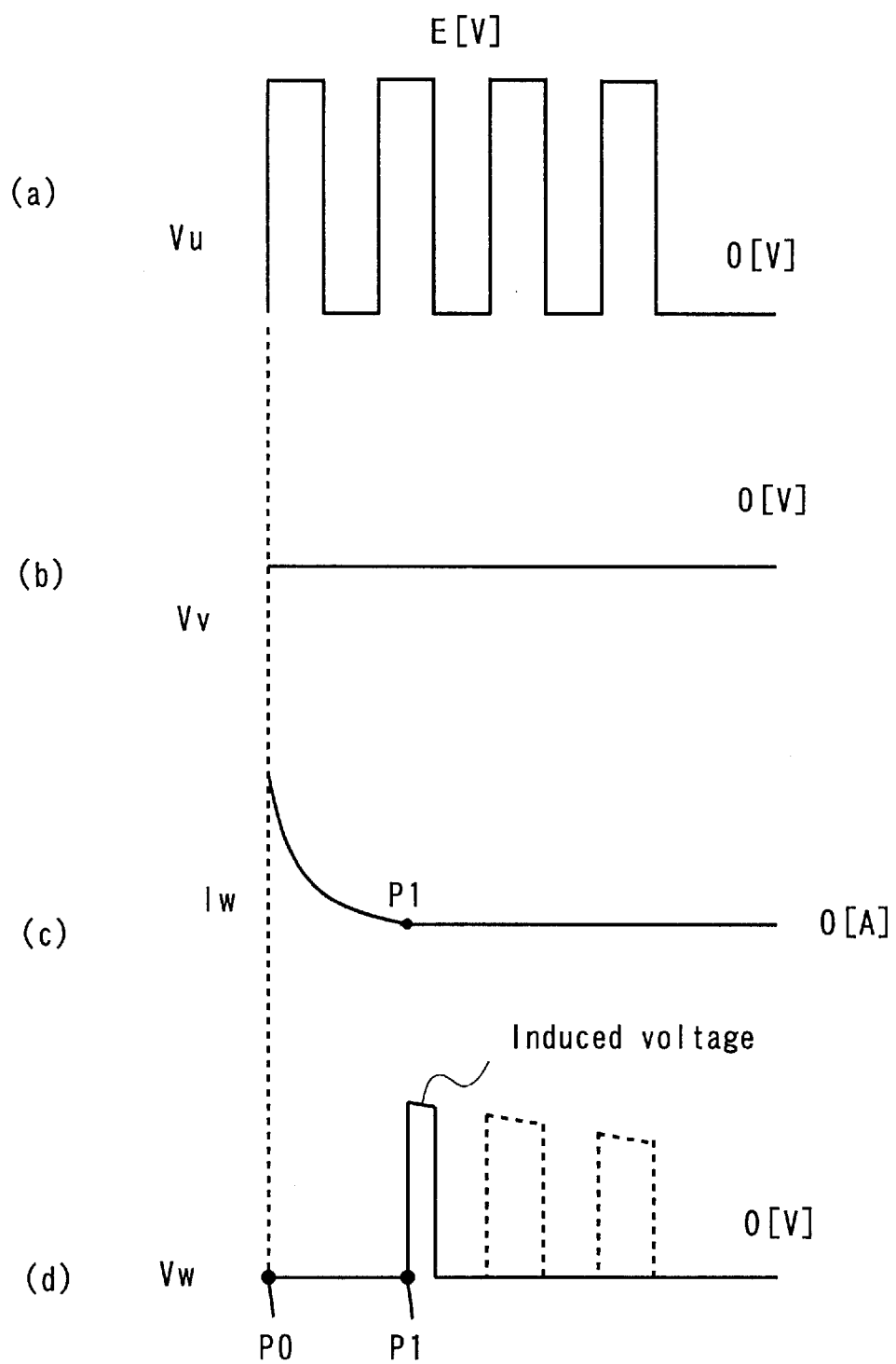
FIG. 13 is comprised of waveform diagrams illustrative of terminal voltages of the coils in the first embodiment. A part (a) of FIG. 13 is a diagram illustrative of a voltage waveform of the terminal voltage Vu in the third embodiment, a part (b) of FIG. 13 is a diagram illustrative of a voltage waveform of the terminal voltage Vv in the third embodiment, a part (c) of FIG. 13 is a diagram illustrative of a current waveform of the w-phase in the third embodiment, and a part (d) of FIG. 13 is a diagram illustrative of a voltage waveform of the terminal Vw of the w-phase.

FIG. 13 illustrates waveform diagrams showing terminal voltages when the upper switching element 6w of the w-phase is cut off. A part (a) of FIG. 13 shows a voltage waveform of the terminal voltage Vu of the u-phase on and after the timing when the switching element 6w of the w-phase is cut off (A of FIG. 12), and apart (b) of FIG. 13 is a voltage waveform of the terminal voltage Vv of the v-phase on and after that timing (A of FIG. 12).

As shown in FIG. 13, only the upper switching element 6u performs a PWM switching operation immediately after the cut-off timing of A, and the lower switching element 7v always conducts. Because of this, as shown in the part (a) of FIG. 13, the terminal voltage Vu varies between E[V] and 0 V according to the cut-off (ON)/conduction(OFF) of the switching operation.

A part (c) of FIG. 13 shows a current waveform of a w-phase current Iw, and a part (d) of FIG. 13 shows a voltage waveform of the terminal voltage Vw of the w-phase. P1 in the part (c) of FIG. 13 denotes the instant when the w-phase current Iw returns to zero from a positive direction. P0 in the part (d) of FIG. 13 denotes the instant when the upper switching element 6w of the w-phase is cut off. Current passes through the diode 8wd of the w-phase from the point P0 to the point P1, indicating that the w-phase terminal voltage Vw is 0 V. Accordingly, by making a comparison between a reference value in the vicinity of 0 V and the terminal voltage Vw, the point P1, wherein the current becomes zero and, a voltage is induced, can be detected.

As shown in the part (d) of FIG. 13 and as will be described later, the control apparatus of the third embodiment is constructed in such a way as to resume switching operations immediately after detection of an induced voltage, so that only one signal indicative of the induced voltage has been generated. In the conventional control apparatus, a signal indicative of an induced voltage is continuously generated, as shown by broken lines of the part (d) of FIG. 13.

Figure 14:
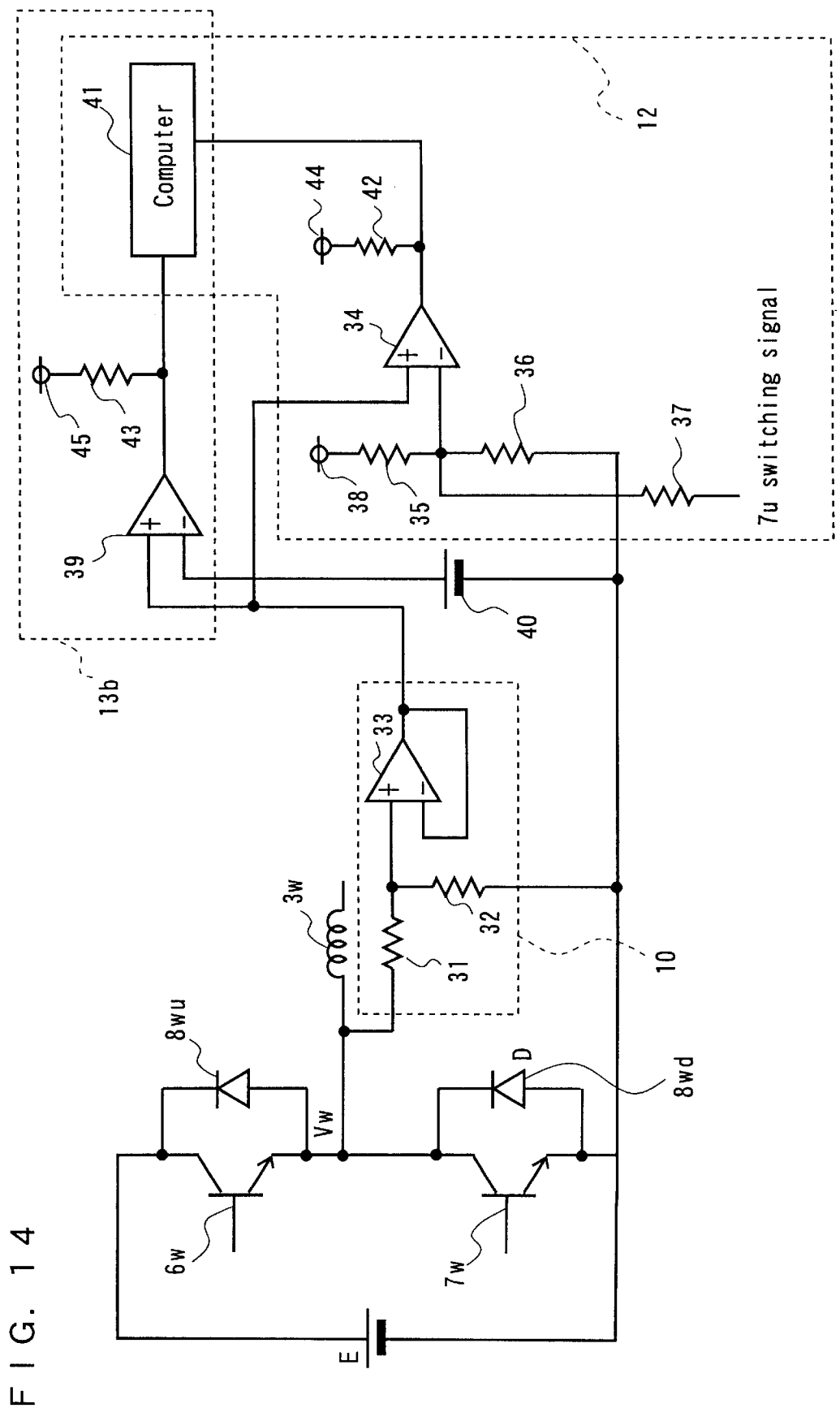
FIG. 14 is a concrete circuit diagram illustrative of a voltage output circuit 10, a current zero decision part 12, and an induced voltage detection circuit 13b in the third embodiment.

Next, referring to FIGS. 14 and 15, the voltage output circuit 10, the current zero decision part 12, and the induced voltage detection circuit 13b in the third embodiment are concretely described.

FIG. 14 shows concrete circuit diagrams of the voltage output circuit 10, the induced voltage detection circuit 13b, and the current zero decision part 12 in the third embodiment. FIG. 15 is a diagram for the description of a terminal voltage waveform versus reference voltage relationship and the timing of detecting an induced voltage.

As shown in FIG. 14, the voltage output circuit 10 is formed of a resistor 31, a resistor 32, and a buffer 33. The voltage output circuit 10 divides the terminal voltage Vw with the resistors 31 and 32 and provides a voltage Vw' through the buffer 33. Input power supplied to the buffer 33 are +Vs and GND, and a voltage-division setting is made such that the central value of the voltage Vw' is Vs/2.

The current zero decision part 12 is formed of a comparator 34, a resistor 35, a resistor 36, and a resistor 37 which prepare a reference voltage at the negative input side of the comparator 34. The current zero decision part 12 is fed by a controlled power supply 38 and a switching signal of the lower switching element 7u. The current zero decision part 12 makes a comparison between the voltage Vw' output through the buffer 33 and the reference voltage, thereby providing a signal at a high (H) or low (L) level.

In FIG. 15, the point P0 corresponds to the timing of A of FIG. 12. The point P1 of FIG. 15 denotes a point indicative of the termination of a period during which current flows through the diode 8wd.

Referring to the voltage waveform of the terminal voltage, an induced voltage is generated when the upper switching element 6u of the u-phase is in the ON state after passing through the point P1 (note that the upper switching element 6v of the v-phase is always in the OFF state). In the following description, such a switching state in which an induced voltage is generated is called the induced voltage output timing.

As shown in FIG. 15, when current changes to zero from a positive direction, a reference voltage with respect to an output induced voltage is set low, like a first reference voltage. As a result of making such a reference voltage setting, it becomes possible to detect when current becomes zero to provide a timing detectable of an induced voltage, regardless of the magnitude of the induced voltage. For instance, when the reference voltage is set high, like a second reference voltage shown in FIG. 15, this creates a state incapable of detecting the point P1.

The comparator 34 gives its output signal at a low level even in periods such as a period TL0 shown in FIG. 15, so that, even if an output signal from the comparator 34 is at a low level, this does not always means that a current of the w-phase is zero. Accordingly, timing, at which such a current becomes zero, is detected together with an output signal of the comparator 34 in connection with information about the cut-off control start of upper and lower switching elements of a specified phase. As shown in FIG. 14, an output signal from the comparator 34 is fed to a computer 41. Within the computer, based on the output signal of the third applied voltage control circuit 17 which controls the cut-off control period of each switching element, a signal is obtained which indicates that current becomes zero and an induced voltage becomes detectable.

When the upper switching element 6u is in the OFF state even when the w-phase current becomes zero (i.e., when it is not an induced voltage output timing), the comparator 34 continues to give a low level (L) output until the instant when the upper switching element 6u turns on, so that it is impossible to detect the moment when current becomes zero. However, since it is possible to detect a point where an induced voltage can be detected, there is no problem.

Next, the reason of why switching signals of the lower switching element 7u are used in the current zero decision part 12 (as shown in FIG. 14) will be explained.

The magnitude of an induced voltage varies depending upon the rotor position of a motor. Therefore, for example, when current changes from a positive direction to zero (at the start point of T1 shown in FIG. 15), the reference voltage, which is compared with an output voltage from the voltage output circuit 10 in the current zero decision part 12, is set low, like the first reference voltage shown in FIG. 15. On the other hand, when current changes from a negative direction to zero (at the start point of T4), the reference voltage is set high, like the second reference voltage.

Next, by reference to FIG. 14, away of producing the first and second reference voltages will be described.

In the first place, a voltage of 5 volts is applied to the control power supply 38 (Vs). In order to produce the w-phase first and second reference voltages, control signals for the on (5 V)/off (0 V) control of the lower switching element 7u are used. Signals of the switching element modulation circuit 9, which are prepared within the computer, are used after they are passed through a photocoupler or the like.

As shown in the part (d) of FIG. 12, the switching signal of the lower switching element 7u is at the low level (L) in the T1 period (0–60 degrees), and is at the high level (H) in the T4 period (180–240 degrees). This is the same as the case of the part (d) of FIG. 21 described in the prior art description part.

In the case that the resistor 35, the resistor 36, and the resistor 37 are identical in resistance with one another, the first reference voltage is Vs/3 in the T1 period, and is 2Vs/3 in the T4 period. Because of this, even when an output induced voltage much differs from Vs/2, the point P1 in the T1 period and the point P4 in the T4 period, at which current has finished passing through a diode, can be detected.

The output of the comparator 34 is generally an open collector output, so that in the third embodiment an output terminal thereof is connected to a resistor 42 as well as to a control power supply 44. Likewise, a comparator 39 has an output terminal that is connected to a resistor 43 as well as to a control power supply 45.

Next, the induced voltage detection circuit 13b in the third embodiment will be described. The induced voltage detection circuit 13b includes a comparator 39 and a reference power supply 40 that is input to the comparator 39. In the third embodiment, the induced voltage Vw' provided from the voltage output circuit 10 varies on the basis of Vs/2, so that the voltage of the reference power supply 40 is set at Vs/2 like the third reference voltage shown in FIG. 15.

As described in the foregoing second embodiment, when an induced voltage is greater than the third reference voltage (Vs/2) at the point P1 in the voltage waveform of FIG. 15, this indicates that the applied voltage frequency is high, and the preparation of an internal angle is delayed accordingly.

In the foregoing description, the case that electric current of the w-phase becomes zero has been discussed. However, the circuit of FIG. 14 is actually arranged for each phase and it is constructed such that induced voltage information is sequentially obtained.

As described above, the third applied voltage control circuit 17 of the third embodiment sends (①) a cut-off control signal to the current zero decision part 12. After receiving the cut-off control signal, the current zero decision part 12 detects a state in which current becomes zero from an output signal of the comparator 34. Immediately after receiving (②) a current zero signal from the current zero decision part 12, the induced voltage detection circuit 13b detects an induced voltage on the basis of a switching state provided from the switching element modulation circuit 9.

As described in the second embodiment, the third applied voltage control circuit 17 controls, based on the induced voltage signal (③) from the induced voltage detection circuit 13b and a signal from the voltage command part 20, the applied voltages (voltage amplitude/voltage frequency) to the switching element groups 6 and 7.

In the above operations, control operations are continuously carried out while sequentially making a change between the u-phase, v-phase, and w-phase.

As described above, the third embodiment shows a concrete way of making it possible to take in a binarized induced voltage. By virtue of the circuitry of FIG. 14 including the voltage output circuit 10 and the induced voltage detection circuit 13b, an induced voltage is voltage-divided for comparison with a reference value placed in the comparator 39, and binarized information (at a high or low level) is provided. This binarized information is input to the computer and calculation of the equation (16) is carried out.

In the third embodiment, a case, in which the coil has three-phases, has been described; however, the present invention is not limited to such and is effective to other cases in which the coil has two phases or a plurality of phases.

Next, control of the cut-off timing (control of the voltage frequency) in the third embodiment will be described in detail.

In the first place, the w-phase switching element 6w is cut off (OFF) at the timing of A of the switching operation of the upper switching element as shown in the part (c) of FIG. 12. Then, after detection of an induced voltage, the conduction (ON) of the w-phase switching element 7w is started at the timing of A' of the switching operation of the lower switching element as shown in the part (f) of FIG. 12.

As shown in the part (e) of FIG. 12, the next switching element cut-off takes place in the lower switching element 7v of the v-phase. The cut-off timing B at this time is after 60 electrical degrees from the time the switching element 6w of the w-phase is cut off. As described in the second embodiment, the third applied voltage control circuit 17 determines a cut-off timing with the following equation (17).

$$T\theta 60\ \deg(n)=T\theta 60\ \deg(n-1)\{1-K3 \cdot K4 \cdot K5\} \tag{17}$$

In the equation (17), as in the second embodiment, the correction gain K3 is set to a value of "1" when the induced voltage is positive, and is set to a value of "−1" when the induced voltage is negative. Further, when current changes from a positive direction to a negative direction, K4=−1, and when current changes from a negative direction to a positive direction, K4=1. Wherein the description of the equation (16), K5 is a correction gain of the 60 degree moving time, the value of K5 ranges from about 0.005 to about 0.05.

According to the above-described conditions, calculation of the 60 degree moving time is carried out for performing control of the cut-off timing. Actually, such a 60 degree moving time calculation has already been started from the point A to the point B of FIG. 12. Because of this, an induced voltage, which was detected between the point A and the point A', is used to perform control of the 60 degree moving time from the point B to the point C.

The motor control apparatus of the third embodiment differs from the motor control apparatus of the second embodiment in that the former control apparatus does not cut off a switching operation for a predetermined period of time but does perform control of the motor by means of the third applied voltage control circuit 17 which changes a cut-off control period. Because the third applied voltage control circuit 17 of the third embodiment detects an induced voltage, as soon as the induced voltage detection circuit 13b detects that induced voltage, switching operations for all the phases including one that has been cut off are carried out. Further, the third applied voltage control circuit 17 provides, based on the induced voltage, a cut-off timing control signal and an applied voltage command to the switching element modulation circuit 9.

As described above, the motor control apparatus of the third embodiment resumes switching operations immediately after detection of an induced voltage, which makes it possible to minimize a cut-off control period, regardless of the operation conditions. As a result, the motor control apparatus of the third embodiment is effective for improving motor efficiency and for lowering motor vibration.

In accordance with the motor control apparatus of the third embodiment, switching operations begin again as soon as an induced voltage is detected, so that the cut-off control period of switching operations does not become a predetermined fixed period. Because of this, when the amount of current is great, both the period between the points P0 and P1 in the T1 period and the period between the points P3 and P4 in the T4 period extend. As a result, the switching cut-off control period extends a little in comparison with a case in which the amount of current is small. However, the conduction control period is sufficiently long in comparison with conventional techniques.

It is to be noted that the cut-off control period will be varied according to motor constants such as the resistance and inductance of a stator coil. Consequently, bracketed angles in FIG. 12 (e.g., (335°) of the part (a) of FIG. 12 and (95°) of the part (b) of FIG. 12) remain undecided, and therefore, the switching timing of each of the switching element groups 6 and 7, when supposing that it takes 10 degrees from the time a current makes to zero to the time an induced voltage is detected, is shown as one example.

Figure 21:
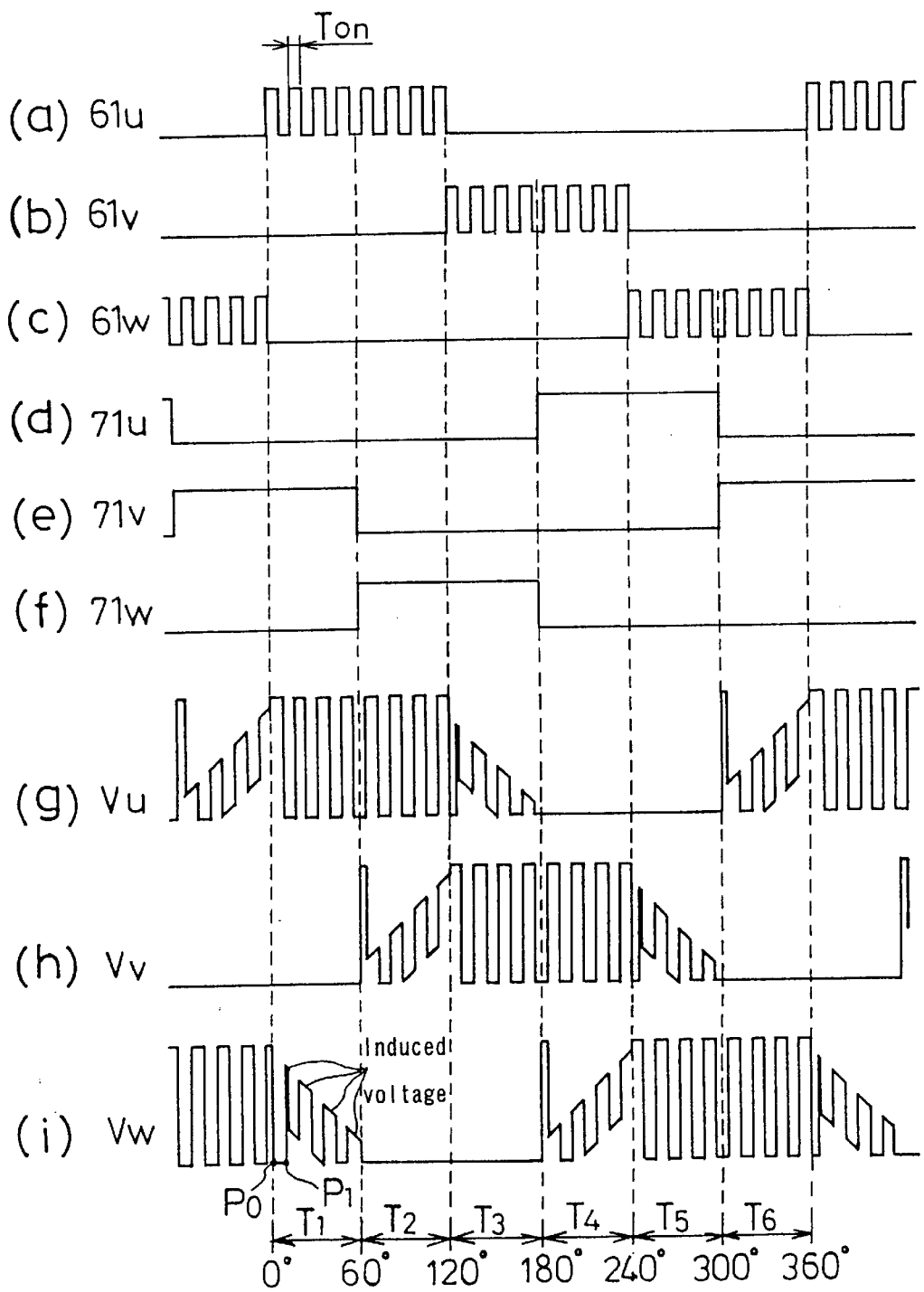
FIG. 21 is comprised of waveform diagrams showing conduction/cut-off timings of switching elements and coil terminal voltages in the conventional control apparatus. Parts (a)–(f) of FIG. 21 are diagrams showing the conduction/cut-off timings of switching elements 6u, 6v, 6w, 7u, 7v, and 7w in the conventional control apparatus and parts (g)–(i) of FIG. 21 are diagrams showing the voltage waveforms of terminal voltages Vu, Vv, and Vw in the conventional control apparatus.
Figure 22:
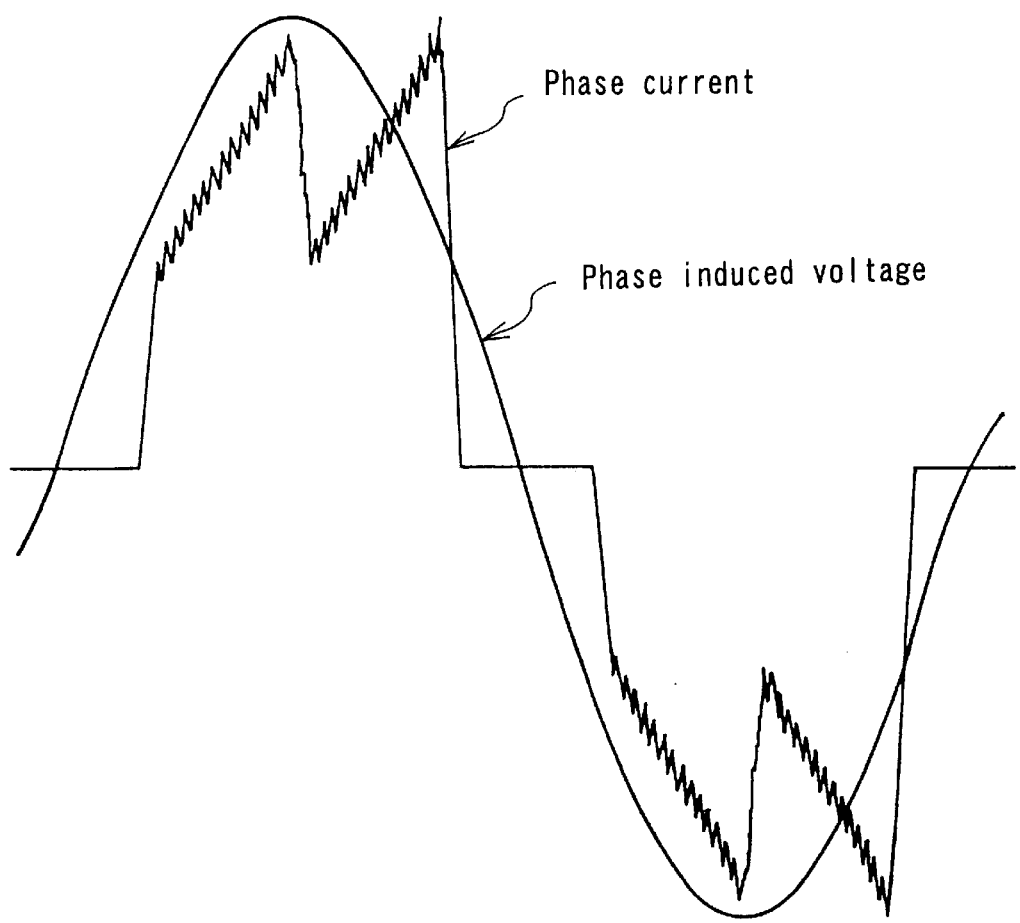
FIG. 22 is a waveform diagram showing a phase induced voltage and a phase current in 120 degree energization in the conventional control apparatus.

For the switching element groups 6 and 7 in the third embodiment, in the period T1 one-side switching operation as shown in FIG. 21 has been described; however, the motor control apparatus of the present invention is able to deal with normal switching in which an upper switching element turns off and thereafter a corresponding lower switching element of the same phase turns on with a dead time. In such a switching operation, it is possible to sinusoidally apply a voltage that is applied. Further, in such a case, detailed angle information is required.

An angle preparation method that is executed in the third applied voltage control circuit 17 will be described below. Angles can be calculated using the following equations (18) and (19) that are the same as the equations (3) and (4) in the first embodiment, and variables which are also the same as the ones in the first embodiment.

$$\Delta\theta PWM = 60\ \deg \times \Delta TPWM/T\theta 60\ \deg(n) \tag{18}$$

$$\theta(m)=\theta(m-1)+\Delta\theta PWM \tag{19}$$

An applied voltage is prepared according to the position θ(m) calculated by the equations (18) and (19) in the same way as the first embodiment.

Figure 16:
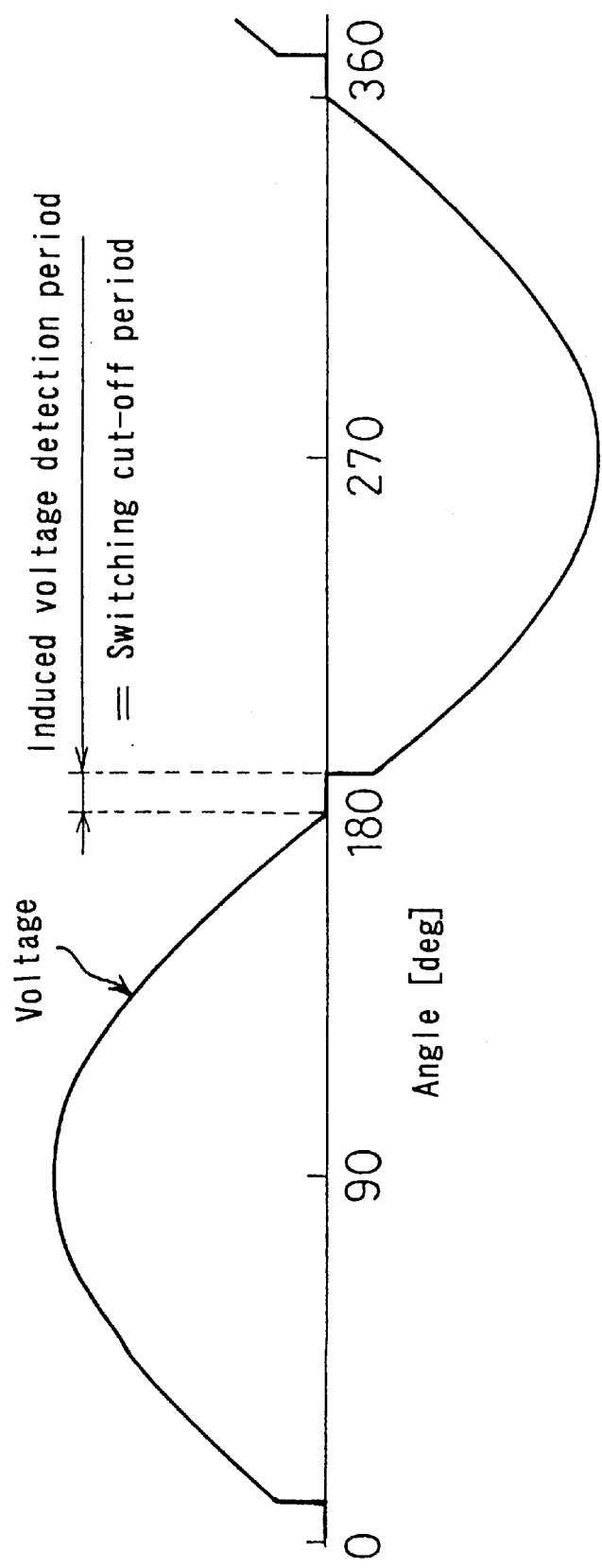
FIG. 16 is a waveform diagram showing a voltage waveform at the time of application of a sinusoidal voltage in the third embodiment.

FIG. 16 shows an example of the preparation of a sinusoidal applied voltage. As shown in FIG. 16, there exists a period during which the application of voltage cannot be carried out due to the detection of an induced voltage. However, during such a period for induced voltage detection, the preparation of angles continues, and the voltage is applied by the use of θ(m) which is continuously prepared after an induced voltage is detected.

As shown in FIG. 16, by shortening a switching cut-off control period and by sinusoidal application of voltage, current becomes sinusoidal thereby reducing vibration. Further, as shown in FIG. 16, by the provision of a structure capable of the cut-off controlling of a phase voltage at the voltage zero time, voltage variation becomes smooth.

For the case of three-phase switching operations such as sinusoidal voltage drive, a switching signal for the lower switching element 7u shown in FIG. 14 will have neither a series of on values or a series of off values. Therefore, instead of the switching signal of the lower switching element 7u, for example, a series of on commands or a series of off commands is prepared within the computer on the basis of the sign of a u-phase command voltage provided from the third applied voltage control circuit 17 for outputting through the I/O port. In this way, changes in the reference voltage becomes possible.

Just for reference, an electrical angle θsa capable of the application of voltage within 180 electrical degrees can be given by the following equation (20) using PWM_ka (which is the number of times a PWM cut-off operation is carried out from the time a current makes to zero to the time an induced voltage is detected).

$$\theta sa=180-\Delta\theta PWM \times PWM\_ka \tag{20}$$

Next, in the induced voltage detection circuit 13b of the third embodiment, the description has been made using an example in which the second reference voltage of the comparator 39 for use in detecting an induced voltage is set at a fixed value. As described in the foregoing second embodiment, in the IPM the induced voltage is advanced in phase with respect to the current, so that it is effective that the second reference voltage is set to a value greater than Vs/2 at the point P1, and to a value smaller than Vs/2 at the point P4. Therefore, by changing to the same configuration as the preparation of the reference voltages at the negative input side of the comparator 34 of the current zero decision part 12, it becomes possible to set a reference voltage with an offset. Because of this, the control operation of a phase, similar to the offset phase βos of the equation (15), becomes possible. Further, by making utilization of an analog voltage that is generated by way of a D/A converter of the computer, the reference voltage can be set to any value. By the foregoing arrangement, the IPM efficiency will be highly enhanced.

Further, in the third embodiment, an output from the buffer 33 is fed directly into an A/D port of the computer 41 when taking in an analog value of the induced voltage. In this case, a process of comparison with the reference voltage which can be set easily within the computer is carried out not in the circuit structures (i.e., the current zero decision part 12 and the induced voltage detection circuit 13b) but in the computer.

Additionally, it is possible to control only one phase, i.e., the w-phase, in the third embodiment. However, in this case the number of times a control operation is carried out will decrease, so that it is impossible to perform control to some degree, and hence, the controllability becomes poor.

Further, in the third embodiment the description has been made in terms of magnet motors (PMSMs); however, the present invention is likewise also applicable to synchronous motors and synchronous reluctance motors (SynRMs). In such a case, the induced voltage (the flux) can be obtained by the production of an inductance and a current.

Figure 17:
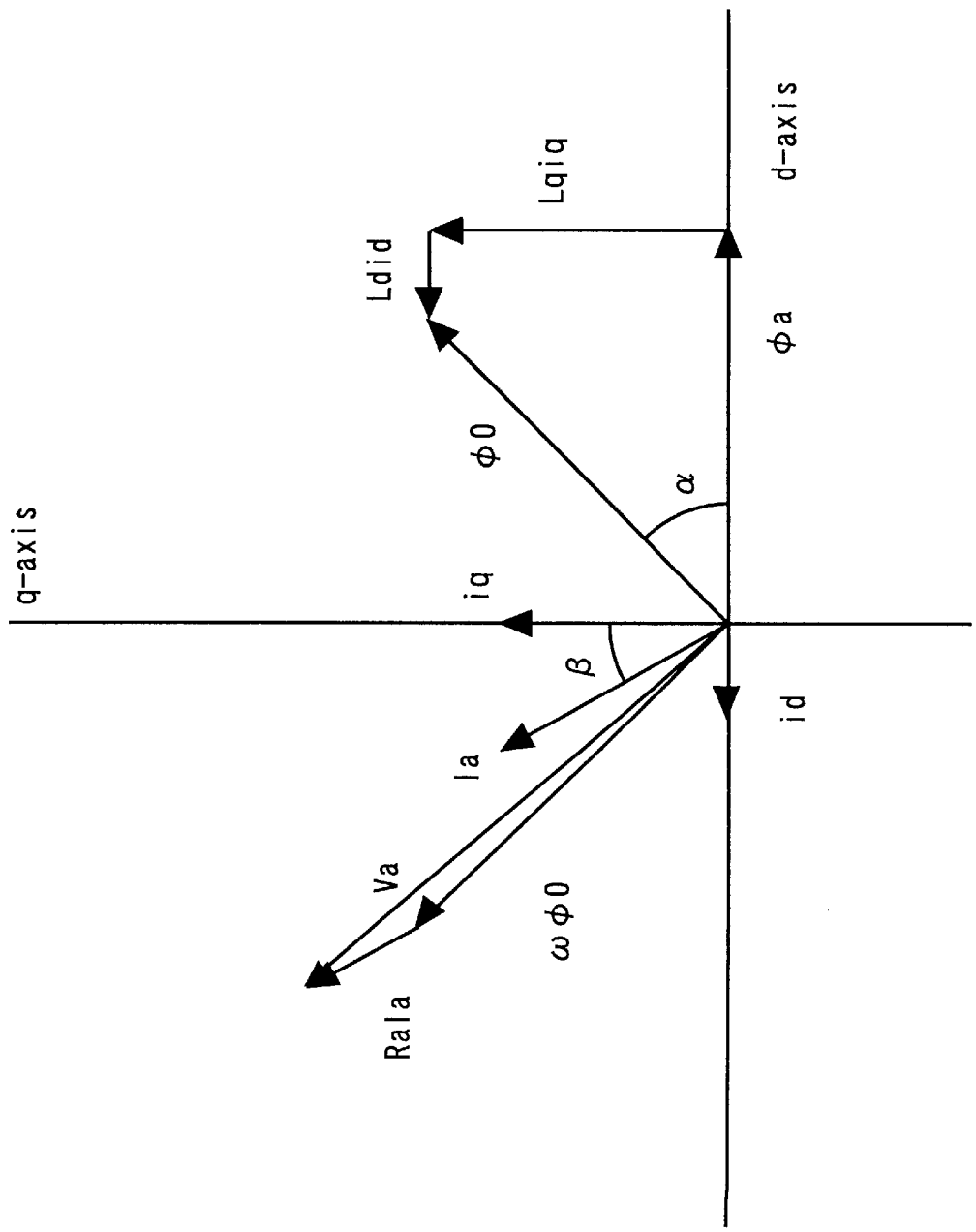
FIG. 17 is a vector diagram for flux, current, and voltage of a motor with a magnet in the third embodiment.

FIG. 17 is a vector diagram about the current, flux, and voltage.

In FIG. 17, φa indicates the armature flux linkage by magnet, id indicates the armature current on the d-axis, iq indicates the armature current on the q-axis, Ld indicates the self-inductance of a d-axis armature winding, Lq indicates the self-inductance of a q-axis armature winding, β indicates the lead angle from the armature current iq on the d-axis and q- axis, φ0 indicates the total flux linkage which is the sum of φa and fluxes Lqiq and Ldid created by coil current, Ra indicates the resistance per one armature winding phase, and Va indicates the voltage vector. Further, an armature current Ia is given by the following equation (21).

$$Ia=\sqrt{(id^2+iq^2)} \quad (21)$$

In FIG. 17, ωφ0 becomes a detectable induced voltage.

Next, a case for synchronous reluctance motors (SynRMs) that produce no flux caused by a magnet is discussed. In this case, φa=0, but an induced voltage is produced because the fluxes Lqiq and Ldid are created. By detection of such an induced voltage, even in a synchronous reluctance motor it becomes possible to perform control of the motor by detecting an induced voltage, as in the case of magnet motors (PMSMs).

Further, the induced voltage detection circuit 13b of the third embodiment detects an analog voltage as in the foregoing second embodiment, thereby providing improvement in the motor control performance.

Fourth Embodiment

Next, a motor control apparatus and a motor unit having such a motor control apparatus in accordance with a fourth embodiment of the present invention will be described.

The motor control apparatus of the fourth embodiment performs either 120 degree energization control on the basis of the zero crossing of an induced voltage described in the prior art technique description part when the motor speed is high or when the motor speed variation is great, or sinusoidal voltage drive control according to the control method described in the foregoing first embodiment when the motor speed is low or when the motor speed variation is small.

Figure 18:
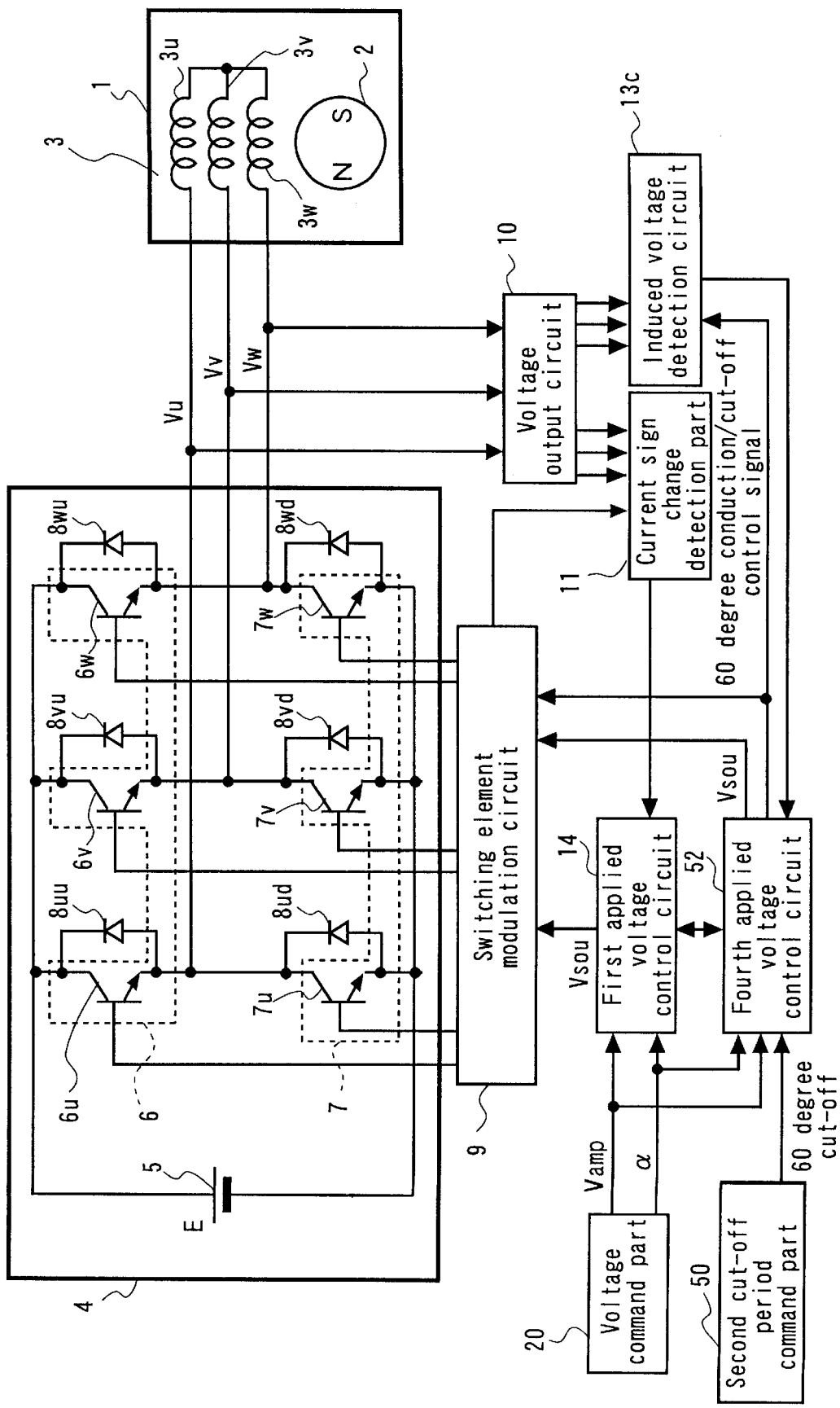
FIG. 18 is a block diagram showing the structure of a motor unit in the fourth embodiment.

FIG. 18 is a block diagram which shows the structure of a motor unit having a motor and a control apparatus for the motor in accordance with the fourth embodiment.

In the description of the fourth embodiment, similar reference numerals have been designated to identical elements of the above-described first embodiment, in FIG. 18, and hence, the description of such elements is omitted.

As in the first embodiment, a motor 1 of the fourth embodiment has stators (not shown in the figure) and a rotor 2. Further, the inverter 4 of the control apparatus is provided with a direct current power source 5, an upper switching element group 6, a lower switching element group 7, and diodes 8uu, 8vu, 8wu, 8ud, 8vd, and 8wd, wherein the upper and lower switching element groups 6 and 7 are three-phase-bridge constructed.

The motor control apparatus of the fourth embodiment is provided with a voltage output circuit 10, a current sign change detection part 11, an induced voltage detection circuit 13c, a first applied voltage control circuit 14, a voltage command part 20, a second cut-off period command part 50 which is a second cut-off period control means, and a fourth applied voltage control circuit 52 which is a fourth applied voltage control circuit means.

In the control apparatus of the fourth embodiment, the control method is switched according to the speed, and such switching improves stability. A control method in the motor control apparatus of the fourth embodiment will be described below.

Since the operation of the current sign change detection part 11 and control operations based thereon are exactly the same as the control operations described in the foregoing first embodiment, the detailed description thereof will be omitted.

The operation of the current sign change detection part 11 will be briefed below.

The current sign change detection part 11 detects, based on the voltage provided from the voltage output circuit 10 in a dead time period, the instant when the sign of a current has changed. Then, the first applied voltage control circuit 14 detects the phase of a current zero cross and the phase of an applied voltage zero cross and the applied voltage is controlled so that a predetermined phase is provided. As a result of such a control operation, it becomes possible to perform control such that the induced voltage becomes identical in phase with the phase current, and in accordance with the fourth embodiment it is possible to accomplish high-efficiency, low-vibration, current-sensorless, and drive with an energization period near to 180 degrees as a wide-angle energization drive.

Operations in the fourth applied voltage control circuit 52 on the basis of the zero crossing of an induced voltage provided out of the induced voltage detection circuit 13c are completely the same as the operations described in the prior art technique description part, and although the detailed description thereof is omitted, such operations will be described briefly below.

Based on a 60 degree cut-off control period provided from the second cut-off period command part 50, the fourth applied voltage control circuit 52 provides a cut-off control signal to the switching element modulation circuit 9. Then, the fourth applied voltage control circuit 52 provides an induced voltage zero cross signal, according to the result of comparing an induced voltage from the induced voltage detection circuit 13 in the cut-off control period and the value of Vs/2.

Based on the zero cross signal, the fourth applied voltage control circuit 52 provides a conduction/cut-off control signal for each 60 degrees and a conduction/cut-off state change timing control signal for each 60 degrees for the switching elements. Further, the fourth applied voltage control circuit 52 provides a phase voltage command Vsou for performing PWM switching operations in a 60 degree period, to the switching element modulation circuit 9.

The switching element modulation circuit 9 performs pulse width modulation operations according to the phase voltage command Vsou from the fourth applied voltage control circuit 52 and actual conduction/cut-off control operations for the switching elements for each 60 degrees. As a result, the inverter 4 applies voltages to the motor 1 to perform drive control.

The fourth applied voltage control circuit 52 of the fourth embodiment has a long detection period for detecting induced voltages and, in addition, employs the zero cross point of an induced voltage as an absolute position of the rotor 2. As a result of such arrangement, the fourth applied voltage control circuit 52 has excellent control stability.

On the other hand, in the first applied voltage control circuit 14, when the speed of the motor 1 is high, the angle error will increase at the time of detecting a change in the current sign, as already described, consequently the detection accuracy of detecting the difference in phase between the zero cross of a command voltage and the zero cross of a phase current and the control stability may become poor. Therefore, when the speed of the motor 1 is high or when the motor speed variation is great, control is performed on the basis of the fourth applied voltage control circuit 52.

On the other hand, when the motor speed is low or when the motor speed variation is small, control is carried out on the basis of the first applied voltage control circuit 14. In such control, the first applied voltage control circuit 14 calculates the speed of the rotor 2 from a 60 degree moving time of the foregoing equation (2). On the other hand, the fourth applied voltage control circuit 52 can easily calculate the speed of the rotor 2 from the zero cross signal interval of an induced voltage.

As described above, by monitoring the speed of the rotor 2 found by the first applied voltage control circuit 14 or by the fourth applied voltage control circuit 52, there will be made a selection between the first applied voltage control circuit 14 and the fourth applied voltage control circuit 52 so that the control circuit 14 or the control circuit 52, whichever is selected, becomes valid as control means.

As described above, in the motor control apparatus of the fourth embodiment, the control method is switched according to the speed, which makes it possible to control high-efficiency, low-vibration motor drive with stability as a whole.

In the fourth embodiment, in the case that the speed of the motor 1 is high or in the case that the speed variation is great, 120 degree energization control is performed on the basis of the zero cross of an induced voltage described in the prior art technique description part. On the other hand, in the case that the speed of the motor 1 is low or in the case the speed variation is small, sinusoidal voltage drive control according to the control method described in the first embodiment is performed. In the fourth embodiment, in the case that the speed of the motor 1 is low or in the case the speed variation is small, the same effects as provided in the fourth embodiment can be obtained even when performing energization control near to 180 degrees according to the control method described in the third embodiment.

Fifth Embodiment

Next, a motor control apparatus and a motor unit having such a motor control apparatus in accordance with a fifth embodiment of the present invention will be described.

The motor control apparatus of the fifth embodiment performs 120 degree energization control on the basis of the zero cross of an induced voltage described in the prior art description part when the motor speed is high or when the motor speed variation is great, and on the other hand, when the motor speed is slow or when the motor speed variation is small, it performs energization control near to 180 degrees according to the control method described in the second embodiment.

Figure 19:
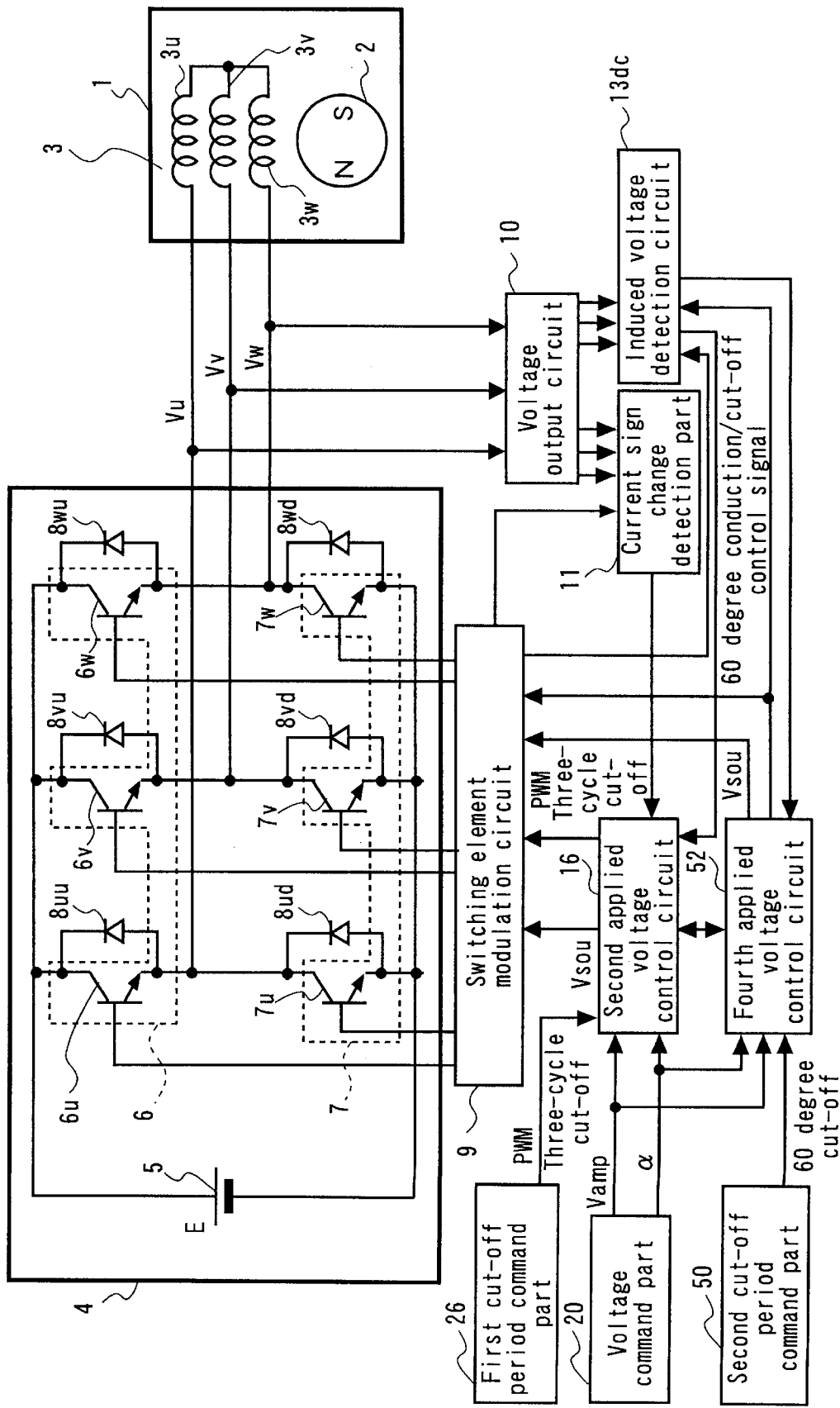
FIG. 19 is a block diagram showing the structure of a motor unit in the fifth embodiment.
Figure 20:
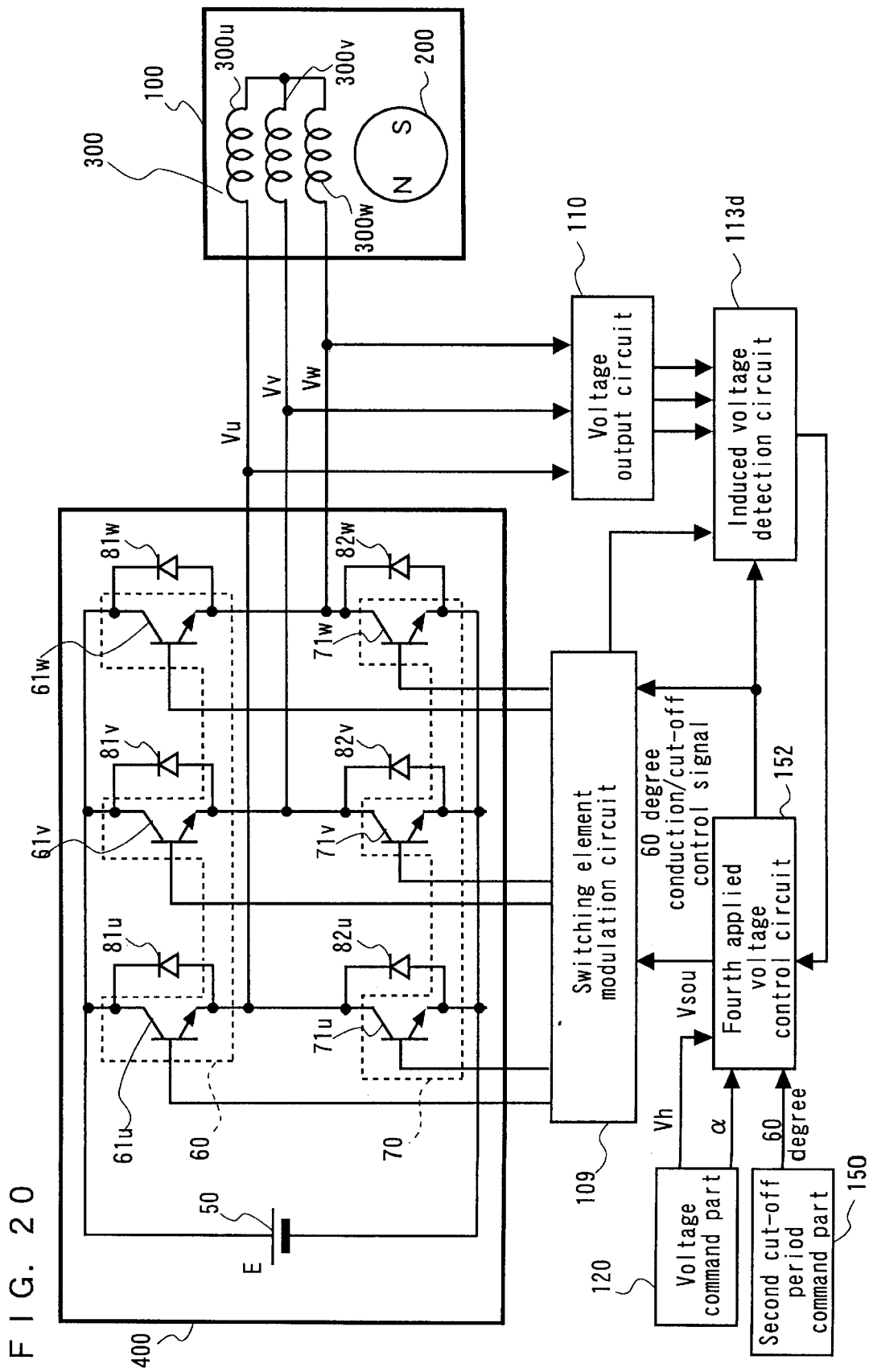
FIG. 20 is a block diagram showing the structure of a conventional motor control apparatus.

FIG. 19 is a block diagram illustrative of the structure of a motor unit including a motor and a control apparatus for the motor in accordance with the fifth embodiment.

In the description of the fifth embodiment, similar reference numerals have been designated to identical elements of the above-described first embodiment, in FIG. 19, and hence, the description of such elements will be omitted.

As in the first embodiment, a motor 1 of the fifth embodiment has stators (not shown in the figure) and a rotor 2. An inverter 4 of the motor control apparatus is provided with a direct current power source 5, an upper switching element group 6, a lower switching element group 7, and diodes 8uu, 8vu, 8wu, 8ud, 8vd, 8wd, wherein the upper and lower switching element groups 6 and 7 are three-phase-bridge constructed. The motor control apparatus of the fifth embodiment is provided with a voltage output circuit 10, a current sign change detection part 11, an induced voltage detection circuit 13d, a second applied voltage control circuit 16, a voltage command part 20, a first cut-off period command part 26, a second cut-off period command part 50, and a fourth applied voltage control circuit 52.

The operation of the motor control apparatus of the fifth embodiment will be described below.

The operation of the current sign change detection part 11 and control operations based thereon are completely the same as the corresponding operations described in the foregoing second embodiment, and the detailed description thereof is omitted here. The operation of the current sign change detection part 11 will be briefed below.

The current sign change detection part 11 detects a voltage from the voltage output circuit 10 in synchronisation with the timing of a dead time period and senses that the sign of a phase current has changed. Upon detection of such a phase current sign change, the current sign change detection part 11 sends a current change signal.

When the current change signal is generated, based on a cut-off control period of three PWM cycles provided from the first cut-off period command part 26, the second applied voltage control circuit 16 delivers cut-off control signals for upper and lower switching elements of a corresponding phase, to the switching element modulation circuit 9. Then, at the timing that current becomes zero and an induced voltage is provided from the voltage output circuit 10, the induced voltage detection circuit 13d detects the induced voltage.

Further, the second applied voltage control circuit 16 sends, based on the value of a detected induced voltage and a value provided from the voltage command part 20, a control signal, which indicates to the switching element modulation circuit 9 the switching timing of conduction/cut-off operations, and an applied voltage command to the switching element modulation circuit 9. The switching element modulation circuit 9 actually performs PWM and the inverter 4 applies voltages to the motor at a desired timing.

The operation of the fourth applied voltage control circuit 52 on the basis of the zero cross of an induced voltage provided from the induced voltage detection circuit 13d is completely the same as the operation described in the prior art description part and the operation described in the fourth embodiment, and the detailed description thereof is omitted accordingly.

The fourth applied voltage control circuit 52 has a long detection period for detecting an induced voltage and employs an induced voltage zero cross point, thereby providing control with stability. Further, the fourth applied voltage control circuit 52 is unlikely to be affected by induced voltage distortion.

On the other hand, in the case that the speed is high, the second applied voltage control circuit 16 is likely to undergo a large angle error when detecting a change in the current sign, as previously stated. Additionally, control performed by the second applied voltage control circuit 16 is likely to be affected by induced voltage distortion and speed variance, and the second applied voltage control circuit 16 therefore has the difficulty in providing stable control.

Accordingly, in the fifth embodiment, control operations are carried out based on the fourth applied voltage control circuit 52 when the speed of the motor 1 is high or when the speed variation is great, while on the other hand control operations are carried out based on the second applied voltage control circuit 16 when the speed of the motor 1 is low or when the speed variation is small.

The induced voltage detection circuit 13d works both when the second applied voltage means 16 operates and when the fourth applied voltage control means 52 operates. Further, the speed of the rotor 2 can be calculated easily either from a 60 degree moving time calculated according to the foregoing equation (14) in the second applied voltage control circuit 16, or from the interval of a induced voltage zero cross signal in the fourth applied voltage control circuit 52. By monitoring the speed of the rotor 2 in the way described above, the motor control apparatus of the fifth embodiment causes either one of the second applied voltage control circuit 16 and the fourth applied voltage control circuit 52 to operate as a control means.

As described above, in the motor control apparatus of the fifth embodiment, the control method is switched according to the speed or variation of speed, which makes it possible to realize high-efficiency, low-vibration motor drive with stability.

As can obviously be seen from the foregoing detailed description of the embodiments, a motor control apparatus and a motor unit having the motor control apparatus in accordance with the present invention have the following effects.

Each of the motor control apparatus and the motor unit of the present invention is constructed (i) to detect the terminal voltage of switching elements of the same phase in a dead time period, (ii) to detect, from the detected terminal voltage, the timing of a change in the sign of a phase current, and (iii) to control the applied voltage on the basis of the difference in phase between a timing signal of the phase current sign change and the timing that the sign of a phase applied command voltage changes. Such arrangement enables the motor control apparatus and the motor unit of the present invention to apply a voltage corresponding to a rotor position of the motor, which makes it possible to provide high-efficiency motor drive. Accordingly, the present invention eliminates the need for providing a non-energization period for induced voltage detection, and hence, current-sensorless, continuous energization can be accomplished, thereby providing a high-efficiency, low-vibration motor control apparatus and motor unit.

Each of the motor control apparatus and the motor unit of the present invention is provided with either a second voltage control means, as described in the second embodiment, for detecting an induced voltage with energization interrupted just for a short period of time when the sign of a phase current changes, or a third voltage control means, as described in the third embodiment, for resuming energization of a phase that has been cut off immediately after the detection of an induced voltage, whereby the cut-off control period for detecting an induced voltage can be reduced to a minimum, and it becomes possible to accomplish current-sensorless drive with an energization period near to 180 degrees as a wide-energization drive. Accordingly, the present invention is able to provide a high-efficiency, low-vibration motor control apparatus and motor unit.

As described in the fourth embodiment, each of the motor control apparatus and the motor unit of the present invention is constructed such that the fourth voltage control means of 120 degree energization and the first voltage control means capable of an energization angle near to 180 degrees are switched according to the speed. As a result of such arrangement, the present invention is able to provide a motor control apparatus and a motor unit which achieve totally high-efficiency, low-vibration motor drive with stability.

As described in the fifth embodiment, each of the motor control apparatus and the motor unit of the present invention is constructed such that the fourth voltage control means of 120 degree energization and the second voltage control means capable of an energization angle near to 180 degrees are switched according to the speed. As a result of such arrangement, the present invention is able to provide a motor control apparatus and a motor unit which achieve totally high-efficiency, low-vibration motor drive with stability.

Although the present invention has been described in terms of the presently preferred embodiments. It is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A motor control apparatus comprising:
   an upper switching element group having a plurality of switching elements which form current paths to coils of respective phases of a motor;
   a lower switching element group having a plurality of switching elements which form current paths from said coils of a respective phases of said motor;
   a plurality of diodes, each said diode being connected in reverse parallel with a corresponding one of said switching elements of said upper and lower switching element groups;
   switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;
   voltage output means for detecting terminal voltage values of said coils of said respective phases connected between said switching elements of respective phases in said upper and lower switching element groups, and for providing said detected terminal voltage values;

at least one current sign change detection means for detecting, from said conduction/cut-off signal of said switching element modulation means and said terminal voltage values detected by said voltage output means, a timing of the sign change of a phase current, and for providing a current sign change timing signal; and first applied voltage control means for issuing, based on said current sign change timing signal and applied voltage values of said coils of said respective phases, a phase applied voltage command to said switching element modulation means.

2. The motor control apparatus in accordance with claim 1, wherein said first applied voltage control means issues to said switching element modulation means said phase applied voltage command corresponding to a rotor position of said motor;

whereby a difference in phase between the time when the sign of said phase applied voltage command changes and the time when the sign of a phase current detected by said current sign change detection means changes will become equal to a set phase difference.

3. The motor control apparatus in accordance with claim 1, wherein, when performing feedback control of a voltage frequency on the basis of (a) a difference in phase between the time when the sign of said phase applied voltage command changes and the time when the sign of a phase current detected by said current sign change detection means changes, (b) said phase difference and a set reference phase difference, and (c) a phase error gain, said first applied voltage control means sets, when advancing a voltage frequency, said phase error gain to a smaller value in comparison with when delaying a voltage frequency, calculates a voltage frequency to prepare a phase applied voltage command, and issues to said switching element modulation means said prepared phase applied voltage command corresponding to a rotor position of said motor.

4. The motor control apparatus in accordance with claim 1, wherein said current sign change detection means is constructed so as to detect, from a terminal voltage detected by said voltage output means, a change in the sign of a phase current during a simultaneous cut-off period of switching elements of the same phase.

5. The motor control apparatus in accordance with claim 1, wherein said current sign change detection means is constructed so as to make a comparison between a period during which a terminal voltage provided from said voltage output means assumes a high or low level and at least one of a conduction and a cut-off command period of a corresponding switching element provided from said switching element modulation means, thereby to detect a change in the sign of a phase current.

6. The motor control apparatus in accordance with claim 1, wherein said switching element modulation means is constructed in such a way as to set the conduction/cut-off frequency of switching elements of one phase that will next undergo a phase current sign change at a higher value than that of switching elements of the remaining other phases.

7. A motor control apparatus comprising:
an upper switching element group having a plurality of switching elements which form current paths to coils of respective phases of a motor;
a lower switching element group having a plurality of switching elements which form current paths from said coils of a respective phases of said motor;
a plurality of diodes, each said diode being connected in reverse parallel with a corresponding one of said switching elements of said upper and lower switching element groups;

switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;

voltage output means for detecting terminal voltage values of said coils of said respective phases connected between said switching elements of respective phases in said upper and lower switching element groups, and for providing said detected terminal voltage values;

at least one current sign change detection means for detecting, from said conduction/cut-off signal of said switching element modulation means and said terminal voltage values detected by said voltage output means, a timing of the sign change of a phase current, and for providing a current sign change timing signal;

first cut-off period command means for setting a cut-off control period so that, when said current sign change detection means detects a change in the sign of a phase current, switching elements of a corresponding phase are cut off for a given period of time and for providing said set cut-off control period;

induced voltage detection means for detecting, based on an output voltage from said voltage output means, induced voltage information, when a cut-off control signal of said cut-off control period is provided; and second applied voltage control means for providing, based on said induced voltage information and said cut-off control period provided from said first cut-off period command means, a conduction/cut-off control signal and a phase applied voltage command to said switching element modulation means.

8. The motor control apparatus in accordance with claim 7,
said induced voltage detection means being constructed as follows:
said induced voltage detection means making a comparison between an induced voltage obtained from said voltage output means when a cut-off control signal is provided and a predetermined reference value;
said induced voltage detection means providing a result of said compare operation.

9. The motor control apparatus in accordance with claim 7,
said induced voltage detection means being constructed as follows:
said induced voltage detection means making a comparison between an induced voltage obtained from said voltage output means when a cut-off control signal is provided and a reference value;
wherein said reference value can be changed so that an offset of said induced voltage can be detected;
said induced voltage detection means making a comparison between said changed reference value and said induced voltage to provide result information of said compare operation.

10. The motor control apparatus in accordance with claim 7,
   said induced voltage detection means being constructed so as to provide an analog value of an induced voltage obtained from said voltage output means when a cut-off control signal is provided.

11. The motor control apparatus in accordance with claim 7, wherein, when a change in the sign of a current is detected by said current sign change detection means, said first cut-off period command means sets a plurality of switching cycle cut-off control signal for the cutting off of upper and lower switching elements of a corresponding phase.

12. The motor control apparatus in accordance with claim 7, wherein said current sign change detection means is constructed so as to detect, from a terminal voltage detected by said voltage output means, a change in the sign of a phase current during a simultaneous cut-off period of switching elements of the same phase.

13. The motor control apparatus in accordance with claim 7, wherein said current sign change detection means is constructed so as to make a comparison between a period during which a terminal voltage provided from said voltage output means assumes a high or low level and at least one of a conduction and a cut-off command period of a corresponding switching element provided from said switching element modulation means, thereby to detect a change in the sign of a phase current.

14. A motor control apparatus comprising:
   an upper switching element group having a plurality of switching elements which form current paths to coils of respective phases of a motor;
   a lower switching element group having a plurality of switching elements which form current paths from said coils of respective phases of said motor;
   a plurality of diodes, each said diode being connected in reverse parallel with a corresponding one of said switching elements of said upper and lower switching element groups;
   switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;
   voltage output means for detecting terminal voltage values of said coils of said respective phases connected between said switching elements of respective phases in said upper and lower switching element groups, and for providing said detected terminal voltage values;
   current zero decision means for providing, based on said terminal voltage values provided from said voltage output means after said switching elements of the same phase are cut off according to a cut-off control signal, a current zero signal indicative of a state in which a phase current becomes zero so that an induced voltage becomes detectable;
   induced voltage detection means for detecting, based on said terminal voltage values provided from said voltage output means on the basis of switching states of said remaining switching elements other than said switching elements of the same phase, induced voltage information upon receipt of said current zero signal from said current zero decision means and for providing said detected induced voltage information; and
   third applied voltage control means for providing to said switching element modulation means a conduction control signal so that phases that have been cut off are made to conduct immediately after said induced voltage information is provided from said induced voltage detection means, thereby to cause all the phases to switch, and for providing, based on said induced voltage information, a conduction/cut-off control signal and a phase applied voltage command to said switching element modulation means.

15. The motor control apparatus in accordance with claim 5,
   said induced voltage detection means being constructed as follows:
      said induced voltage detection means making a comparison between an induced voltage obtained from said voltage output means when a cut-off control signal is provided and a predetermined reference value;
      said induced voltage detection means providing a result of said comparison operation.

16. The motor control apparatus in accordance with claim 14,
   said induced voltage detection means being constructed as follows:
      said induced voltage detection means making a comparison between an induced voltage obtained from said voltage output means when a cut-off control signal is provided and a reference value;
      wherein said reference value can be changed so that an offset of said induced voltage can be detected;
      said induced voltage detection means making a comparison between said changed reference value and said induced voltage to provide result information of said comparison operation.

17. The motor control apparatus in accordance with claim 14,
   said induced voltage detection means being constructed so as to provide an analog value of an induced voltage obtained from said voltage output means when a cut-off control signal is provided.

18. A motor control apparatus comprising:
   an upper switching element group having a plurality of switching elements which form current paths to coils of respective phases of a motor;
   a lower switching element group having a plurality of switching elements which form current paths from said coils of a respective phases of said motor;
   a plurality of diodes, each said diode being connected in reverse parallel with a corresponding one of said switching elements of said upper and lower switching element groups;
   switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;
   voltage output means for detecting terminal voltage values of said coils of said respective phases connected between said switching elements of respective phases in said upper and lower switching element groups, and for providing said detected terminal voltage values;
   at least one current sign change detection means for detecting, from said conduction/cut-off signal of said switching element modulation means and said terminal voltage values detected by said voltage output means, a timing of the sign change of a phase current, and for providing a current sign change timing signal;

first applied voltage control means for issuing, based on said current sign change timing signal and applied voltage values of said coils of said respective phases, a phase applied voltage command to said switching element modulation means;

second cut-off period command means for setting a cut-off control period so that said upper and lower switching elements of the same phase continue to be cut off regardless of phase current values and for providing said set cut-off control period;

induced voltage detection means for detecting, based on an output voltage from said voltage output means, induced voltage information in a period during which a cut-off control signal of said cut-off control period is provided and for providing said detected induced voltage information; and fourth applied voltage control means for binarizing an induced voltage of said induced voltage information provided from said induced voltage detection means to form an induced voltage timing signal and for providing, based on said induced voltage timing signal and said cut-off control period from said second cut-off period command means, a conduction/cut-off control signal and a phased applied voltage command to said switching element modulation means;

whereby, when the speed of said motor is high or when the variation in speed of said motor is great, said switching element modulation means will be controlled by said fourth applied voltage control means; and whereby, when the speed of said motor is low or when the variation in speed of said motor is small, said switching element modulation means will be controlled by said first applied voltage control means.

19. A motor control apparatus comprising:

an upper switching element group having a plurality of switching elements which form current paths to coils of respective phases of a motor;

a lower switching element group having a plurality of switching elements which form current paths from said coils of a respective phases of said motor;

a plurality of diodes, each said diode being connected in reverse parallel with a corresponding one of said switching elements of said upper and lower switching element groups;

switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases of said motor;

voltage output means for detecting terminal voltage values of said coils of said respective phases connected between said switching elements of respective phases in said upper and lower switching element groups, and for providing said detected terminal voltage values;

at least one current sign change detection means for detecting, from said conduction/cut-off signal of said switching element modulation means and said terminal voltage values detected by said voltage output means, at timing of the sign change of a phase current, and for providing a current sign change timing signal;

first cut-off period command means for setting a cut-off control period so that, when said current sign change detection means detects a change in the sign of a current, switching elements of a corresponding phase are cut off for a given period of time and for providing said set cut-off control period;

induced voltage detection means for detecting, based on an output voltage from said voltage output means, induced voltage information, when a cut-off control signal is provided in said cut-off control period;

second applied voltage control means for providing, based on said induced voltage information and said cut-off control period provided from said first cut-off period command means, a conduction/cut-off control signal and a phase applied voltage command to said switching element modulation means;

second cut-off period command means for setting a cut-off control period so that said switching elements of the same phase are cut off continuously regardless of phase currents and for providing said set cut-off control period; and fourth applied voltage control means for providing, based on an induced voltage timing signal as a result of binarization of an induced voltage of said induced voltage information provided from said induced voltage detection means, a conduction/cut-off control signal and a phased applied voltage command to said switching element modulation means;

whereby, when the speed of said motor is high or when the variation in speed of said motor is great, said switching element modulation means will be controlled by said fourth applied voltage control means; and whereby, when the speed of said motor is low or when the variation in speed of said motor is small, said switching element modulation means will be controlled by said second applied voltage control means.

20. A motor unit comprising:

a rotor having a permanent magnet;

a stator having coils of plural phases;

an upper switching element group having a plurality of switching elements which form current paths to coils of respective phases;

a lower switching element group having a plurality of switching elements which form current paths from said coils of said respective phases;

a plurality of diodes, each said diode being connected in reverse parallel with a corresponding one of said switching elements of said upper and lower switching element groups;

switching element modulation means for providing a conduction/cut-off signal to said upper and lower switching element groups thereby to cause switching elements of the same phase to perform a switching action so that said switching elements conduct or are cut off with the provision of a simultaneous cut-off period, for the application of voltages to said coils of said respective phases;

voltage output means for detecting terminal voltage values of said coils of said respective phases connected between said switching elements of respective phases in said upper and lower switching element groups, and for providing said detected terminal voltage values;

at least one current sign change detection means for detecting, from said conduction/cut-off signal of said switching element modulation means and said terminal voltage values detected by said voltage output means, a timing of the sign change of a phase current, and for providing a current sign change timing signal; and first applied voltage control means for issuing, based on said current sign change timing signal and applied voltage values of said coils of said respective phases, a phase applied voltage command to said switching element modulation means.

21. The motor unit in accordance with claim 20, wherein said current sign change detection means is constructed so as to detect, from a terminal voltage detected by said voltage output means, a change in the sign of a phase current during a simultaneous cut-off period of switching elements of the same phase.

22. The motor unit in accordance with claim 20, wherein said current sign change detection means is constructed so as to make a comparison between a period during which a terminal voltage provided from said voltage output means assumes a high or low level and at least one of a conduction and a cut-off command period of a corresponding switching element provided from said switching element modulation means, thereby to detect a change in the sign of a phase current.

23. The motor unit in accordance with claim 20, wherein said switching element modulation means is constructed in such a way as to set the conduction/cut-off frequency of upper and lower switching elements of one phase that will next undergo a phase current sign change at a higher value than that of switching elements of the remaining other phases.

* * * * *